(12) United States Patent
Dittia

(10) Patent No.: US 10,936,206 B1
(45) Date of Patent: Mar. 2, 2021

(54) HANDLING A DEVICE IN A LATENCY STATE IN A REDUNDANT STORAGE SYSTEM

(71) Applicant: Tintri by DDN, Inc., Santa Clara, CA (US)

(72) Inventor: Zubin D. Dittia, San Mateo, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 355 days.

(21) Appl. No.: 15/886,156

(22) Filed: Feb. 1, 2018

Related U.S. Application Data

(60) Provisional application No. 62/482,028, filed on Apr. 5, 2017.

(51) Int. Cl.
  *G06F 16/10* (2019.01)
  *G06F 3/06* (2006.01)
  *G06F 11/10* (2006.01)

(52) U.S. Cl.
  CPC .......... *G06F 3/0619* (2013.01); *G06F 3/0656* (2013.01); *G06F 3/0689* (2013.01); *G06F 11/1076* (2013.01); *G06F 2003/0691* (2013.01)

(58) Field of Classification Search
  CPC ............... G06F 16/2272; G06F 16/278; G06F 11/1076; G06F 3/0619; G06F 3/0656; G06F 3/0689
  See application file for complete search history.

(56) References Cited

U.S. PATENT DOCUMENTS

| | | | | |
|---|---|---|---|---|
| 7,181,578 B1* | 2/2007 | Guha | .................... | G06F 3/0607 711/154 |
| 8,214,719 B1* | 7/2012 | Sheng | .................... | G06F 11/073 714/763 |
| 2005/0015653 A1* | 1/2005 | Hajji | .................... | G06F 11/1092 714/6.2 |
| 2010/0070703 A1* | 3/2010 | Sarkar | .................... | G06F 3/0613 711/114 |
| 2013/0067174 A1* | 3/2013 | Moss | .................. | G06F 11/1471 711/154 |
| 2014/0025990 A1* | 1/2014 | Akutsu | .................. | G06F 3/0619 714/6.22 |
| 2017/0329557 A1* | 11/2017 | Berger | .................. | G06F 3/0659 |

* cited by examiner

*Primary Examiner* — Tarek Chbouki
(74) *Attorney, Agent, or Firm* — Van Pelt, Yi & James LLP

(57) ABSTRACT

In an embodiment, a system for handling a device in latency state in a redundant storage system includes a processor configured to process a write request to a plurality of devices associated with a redundant storage system. The processor is further configured to receive a set of indications of write successes from a set of devices included in the plurality of devices other than a first device, and send an indication of a completed write to a requestor associated with the write request based at least in part on an indication that the first device meets a set of one or more criteria associated with a latency state. The system further includes a memory coupled to the processor and configured to store the write request.

21 Claims, 16 Drawing Sheets

_US 10,936,206 B1_

HANDLING A DEVICE IN A LATENCY STATE IN A REDUNDANT STORAGE SYSTEM

CROSS REFERENCE TO OTHER APPLICATIONS

This application claims priority to U.S. Provisional Patent Application No. 62/482,028 entitled HIDING HIGH WRITE LATENCIES FROM TRANSIENTLY MISBEHAVING DRIVES IN A RAID SUBSYSTEM filed Apr. 5, 2017 which is incorporated herein by reference for all purposes.

BACKGROUND OF THE INVENTION

A Redundant Array of Inexpensive Drives (RAID) subsystem is the part of a storage system that allows multiple storage devices to be combined to store a large filesystem or object store, with redundancy built into it to prevent data loss in the presence of one or more drive failures, and with recovery mechanisms to restore data from a failed drive onto a new healthy drive. The drives themselves could be part of a single controller system, or could be accessible from multiple controllers, or could reside in different systems (a distributed RAID group), for example.

Conventionally, once high latency is detected in response to a user request in a drive that is included in a RAID group, the drive is not (immediately) considered to be failed. However, the user that had issued the request is typically made to wait a considerably long time before either a requested response or an error message is received from the RAID group, which is undesirable for the user and for the RAID group in handling subsequent user requests.

BRIEF DESCRIPTION OF THE DRAWINGS

Various embodiments of the invention are disclosed in the following detailed description and the accompanying drawings.

DETAILED DESCRIPTION

Figure 1:
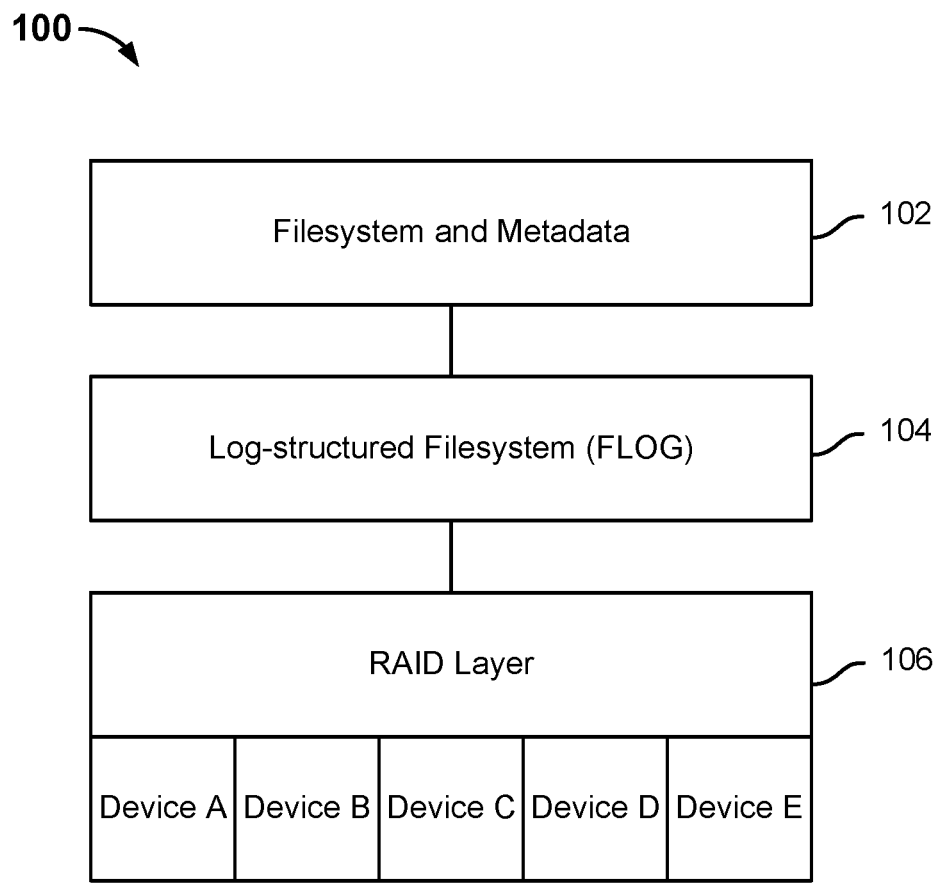
FIG. 1 is a software schematic of an embodiment of a system for handling a device in a latency state in a redundant storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of handling a device in a latency state in a redundant storage system are described herein. In various embodiments, a "latency state" refers to a device that is experiencing high latency (e.g., a device that has failed to generate a response to a request for at least a predetermined threshold amount of time). A write request to a plurality of devices associated with a redundant storage system is processed. In various embodiments, the redundant storage system comprises a Redundant Array of Inexpensive Drives (RAID) system. In various embodiments, a drive within a RAID system is also referred to as a "device." For example, the write request may be directed to one or more devices within the RAID system. A set of indications of write successes is received within a timeout interval from a set of devices included in the plurality of devices other than at least one device. The device of the RAID group from which an indication of write successes is not received within the timeout interval is determined to be in a "latency state." In some embodiments, a "latency state" is also sometimes referred to as a "partially failed state" or "partial failure state." In some embodiments, a device in a latency state is sometimes referred to as being "partially failed." In response to the write request, an indication of a completed write is sent to the requestor of the request based at least in part on the indication that the RAID system includes a device that is in a latency state.

As such, various embodiments described herein enable users of a RAID system to be isolated from one or more misbehaving devices (devices that are in the latency state) that may incur high or very high write latency on a transient basis, without needing to outright fail such devices at the first sign of trouble. In this scenario, it is desirable to hide the effect of the devices in latency states from other subsystems in the storage system, until such devices meet a prescribed set of conditions. For example, the prescribed set of conditions includes when the device recovers on its own or the device experiences an outright failure, as will be described in further detail below.

FIG. 1 is a software schematic of an embodiment of a system for handling a device in a latency state in a redundant storage system. In the example of FIG. 1, the redundant storage system is a RAID system. System 100 includes filesystem and metadata 102, log-structured filesystem (FLOG) 104, RAID layer 106, and Devices A, B, C, D, and E. Filesystem and metadata 102 comprise a lower level filesystem and manager of metadata. In various embodiments, filesystem and metadata 102 use key-value store functions to construct a filesystem that stores files. The filesystem addresses a block of data, which address is stored as metadata and the address maps to underlying blocks and their storage locations in FLOG and RAID. FLOG 104 comprises a higher level filesystem program that is configured to receive and respond to requests from applications to the RAID system (including RAID layer 106 and the RAID group of Devices A, B, C, D, and E). FLOG 104 is configured to track where objects are stored in the RAID system by, for example, assigning a FLOG address to each object. FLOG 104 is also configured to perform garbage collection on the RAID system and keep track of where the live instance (current version) and any obsolete instance(s) (overwritten/stale version(s)) of an object are stored on the RAID group. As more fully described below, a stripe is a set of data stored in a RAID group, which data is "striped" across the devices such that logically sequential data is segmented in a way that accesses of sequential segments can be made to different devices. Garbage collection is performed by, for example, reading one or more "source" stripes of the RAID devices containing data and copying only the live data from these stripes into new free "target" stripes of the RAID group. After this is done, the source stripes can be declared to be free and can be used in the future to write either new incoming data, or serve as target stripes for the garbage collection process to use in the future. If the source stripes contain a lot of obsolete objects, then the garbage collection process will end up freeing up more stripes than it uses, thus allowing space to be reclaimed for future use. RAID layer 106 is configured to process the requests that it receives from FLOG 104 and also return the results of the requests back to FLOG 104. For example, RAID layer 106 is configured to handle a write request to a full stripe of the RAID. In some embodiments, a partial write is possible (e.g., writing to a subset of stripe units). For example, to repair a stripe, partial writes are made to the units that are to be repaired.

Devices A, B, C, D, and E in the RAID group comprise a logical container. At least some of Devices A, B, C, D, and E are configured to redundantly store data based on a protocol of data distribution of a RAID scheme that is associated with the RAID group. Typically, data stored in a RAID group is "striped" across the devices such that logically sequential data is segmented in a way that accesses of sequential segments can be made to different devices. RAID layer 106 is configured to receive an input set of data (e.g., associated with a write request that is received from FLOG 104 or as a part of a garbage collection process), process the input data according to a protocol of data distribution (e.g., generate parity information based on the input data) that is applied to the RAID group, and store the outputted data across Devices A, B, C, D, and E according to the protocol of data distribution that is applied to the RAID group.

As will be described in further detail below, RAID layer 106 is also configured to determine whether a device included in the RAID group is currently in a latency state based on the manner in which that device responds to a write request. For example, a device may experience abnormal, high latency due to internal administrative processes that are being performed within the device and/or due to an abnormality that has occurred in a piece of hardware that is connected to the RAID group. In various embodiments, a device that is determined to be in a latency state is treated differently than devices that are either functioning normally or have completely failed. In various embodiments, for subsequent write requests that are directed at least in part to a device that is determined to be currently in a latency state, acknowledgments of successful or completed writes will be sent by RAID layer 106 back to FLOG 104 in the event that the write requests are completed on the zero or more devices of the RAID group to which the write requests also pertain, other than the device that is currently in the latency state. As such, RAID layer 106 is able to hide the abnormal, high latency behavior of the device that is currently in the latency state from FLOG 104 (and therefore, a user of the RAID group) by returning an indication of write success prior to actually successfully writing to the device that is currently in the latency state. Because abnormal, high latency behavior of a device may be transient in nature, there is a possibility that the device that is currently in the latency state may start behaving normally again over time and exit the latency state. As such, it may be inefficient to signal to FLOG 104 to fail the device entirely upon a first detection that the device is behaving abnormally/with high latency or cause FLOG 104 to wait until a response is finally received or not received from the device, as the act of swapping that device out for a new device and rebuilding the content of that failed device is costly in both computational resources and time. In various embodiments, while a device of the RAID group is determined to currently be in a latency state, RAID layer 106 responds to a read request to that device by returning the requested current data stored in that device, if available, or reconstructing the requested data or retrieved buffered current data if the requested current data associated with that device is not stored in the device, as will be described in further below. In various embodiments, RAID layer 106 will check, over time, whether a device that is currently in the latency state has either failed outright (entered the failed state) or recovered to be in a normal functional state.

Figure 2:
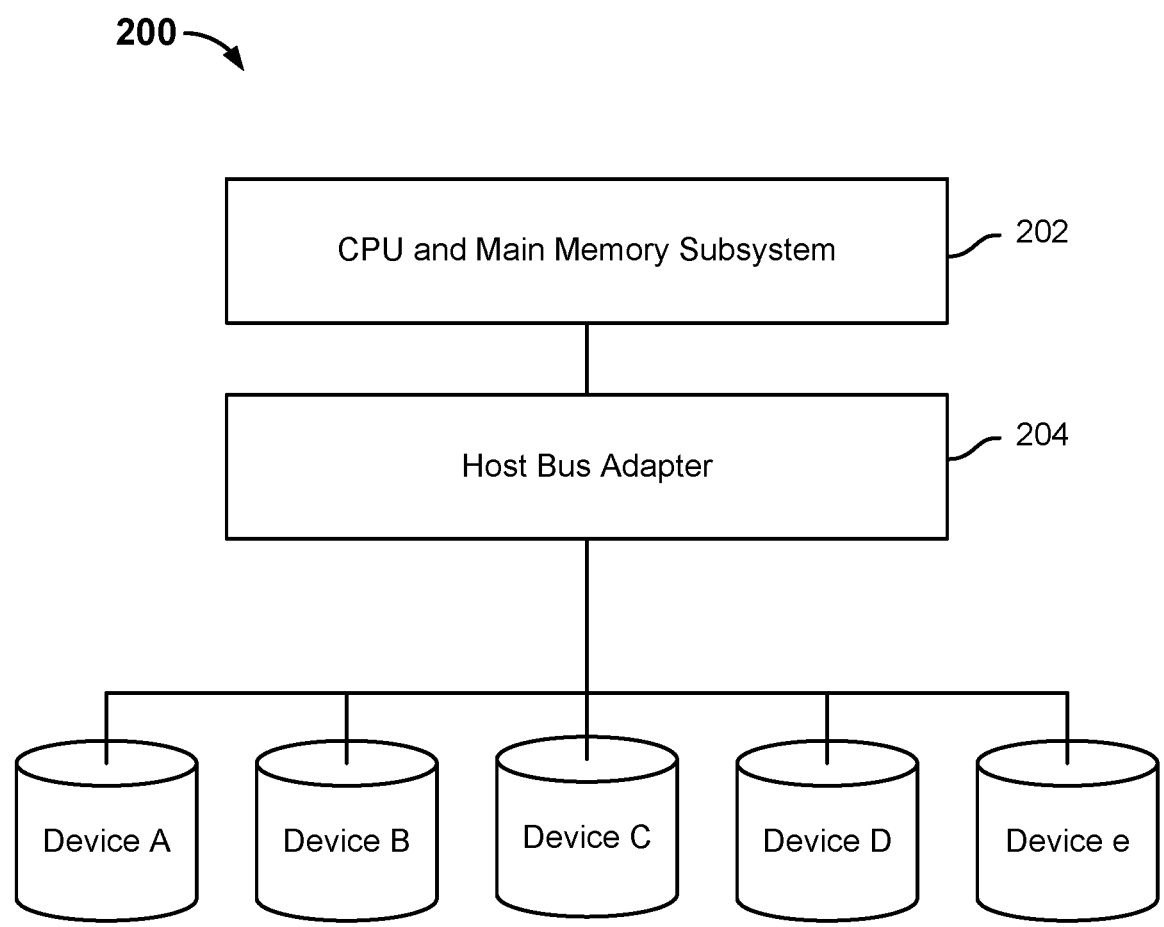
FIG. 2 is a hardware schematic of an embodiment of a RAID controller and a RAID group of devices.

FIG. 2 is a hardware schematic of an embodiment of a RAID controller and a RAID group of devices. In some embodiments, RAID layer 106 and Devices A, B, C, D, and E of system 100 of FIG. 1 may be implemented using system 200. System 200 includes CPU (Central Processing Unit) and main memory subsystem 202, host bus adapter 204, and Devices A, B, C, D, and E. In various embodiments, a RAID controller may be implemented using an instance of CPU and main memory subsystem 202. In various embodiments, a RAID layer is implemented by a RAID controller. As such, more than one RAID controller (more than one instance of CPU and main memory subsystem 202, although not shown in FIG. 2) may be associated with a RAID group to implement failover in the event that the primary RAID controller fails. Host bus adapter 204 comprises a hardware component that connects the CPU and main memory subsystem 202 to Devices A, B, C, D, and E. The main memory may include one or both of volatile memory (e.g., DRAM) and/or non-volatile memory (e.g., NVRAM). In some embodiments, Devices A, B, C, D, and E include at least one device that is configured to be a spare device while the remaining devices are active. Unlike the active devices, the spare device(s) are not written to but are on standby to store reconstructed data for an active device in the RAID group in the event that the active device fails and needs to be rebuilt.

RAID stores data in "stripes" spanning all devices currently in the RAID group. The data from any given stripe on a single device is called a "stripe unit," and can be an arbitrary number of bytes. A stripe typically includes some number of user data stripe units and some number of parity data stripe units. The parity stripe units can be used to reconstruct user data stripe units if any of the devices containing user data stripe units experience data corruption or failure. The number of parity stripe units in a stripe decides the amount of redundancy in the RAID group, i.e., the number of device failures that can be tolerated before there is actual loss of data.

When user data is written to a RAID group, it is usually collected in the main memory until there are enough user data "blocks" to partially or mostly fill the user data stripe units of a stripe; at that point, the parity stripe units are computed and the entire stripe gets written to the storage devices in the RAID group.

User data can be read at any point from the device on which it was originally written as part of a stripe. However, if that device is down, or if the data that is read is corrupted, it can be reconstructed by reading data from other stripe units (including parity).

The description below describes techniques for handling a single device in a RAID group that is experiencing high write latency (other devices in the system are assumed to be working normally, i.e., they have low write latency). However, the mechanisms described herein are easily extensible to an arbitrary number of devices that simultaneously (or separately) experience high write latency.

Figure 3:
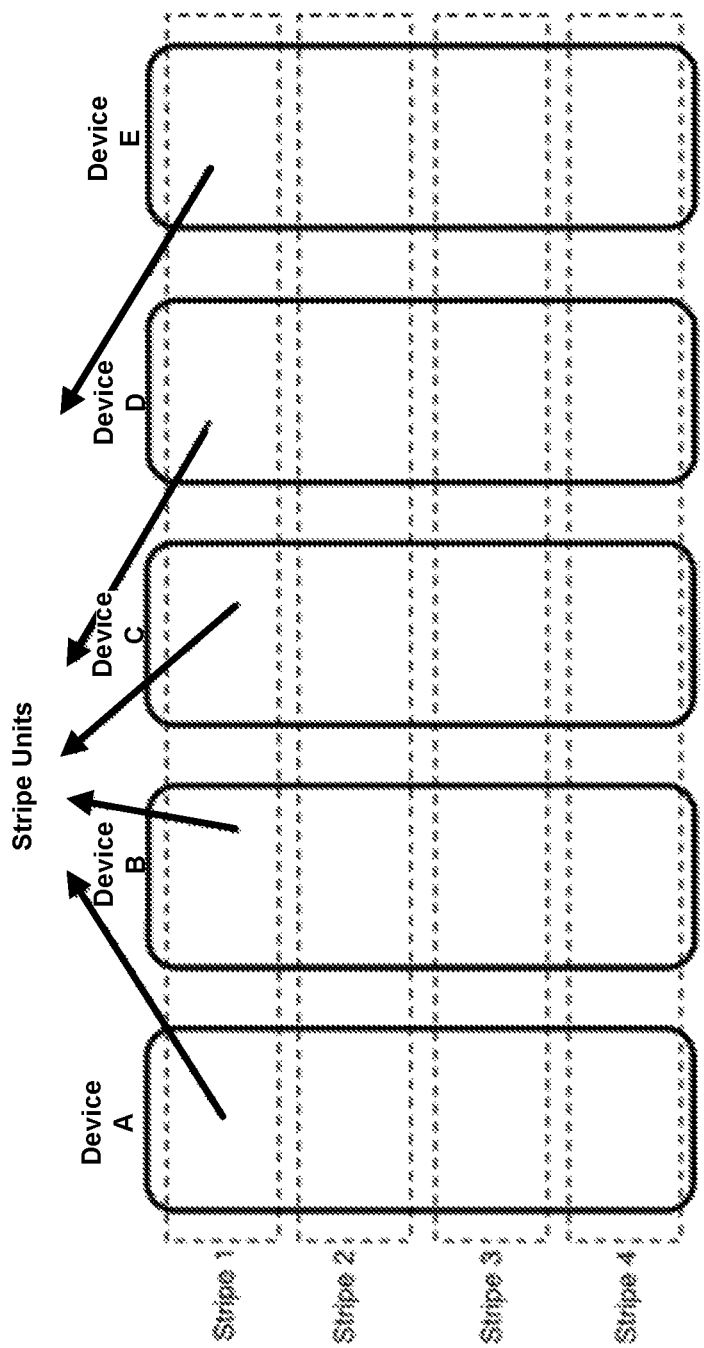
FIG. 3 is a diagram showing stripes and stripe units in an example RAID group.

FIG. 3 is a diagram showing stripes and stripe units in an example RAID group. For example, Devices A, B, C, D, and E of FIG. 2 have stripes and stripe units like those shown in the example of FIG. 3. In the context of a RAID group, the entire storage space on each device (e.g., SSD or HDD) is divided into a series of contiguous blocks ("stripe units") with the same size. In the example of FIG. 3, the stripe units in a device are numbered from stripe unit 1 to stripe unit 4. The stripe units on all the devices with the same stripe unit number form a stripe. For example, stripe unit 1 of each of devices "Device A, "Device B," "Device C," Device D," and "Device E" form "Stripe 1." A "stripe unit" is the basic unit for data distribution and a stripe unit can be used to store data or parity. A "stripe" is the basic unit for fault tolerance. Usually, each stripe has one or two stripe units to store parity information, which allows RAID to recover the data of data stripe units on the device(s) in latency states or the device(s) in failed states. For example, in the event that the data of stripe unit 1 of Device B needed to be recovered, that stripe unit's data may be reconstructed using at least some of the data stored in Stripe 1 in Devices A, C, D, and E.

Figure 4:
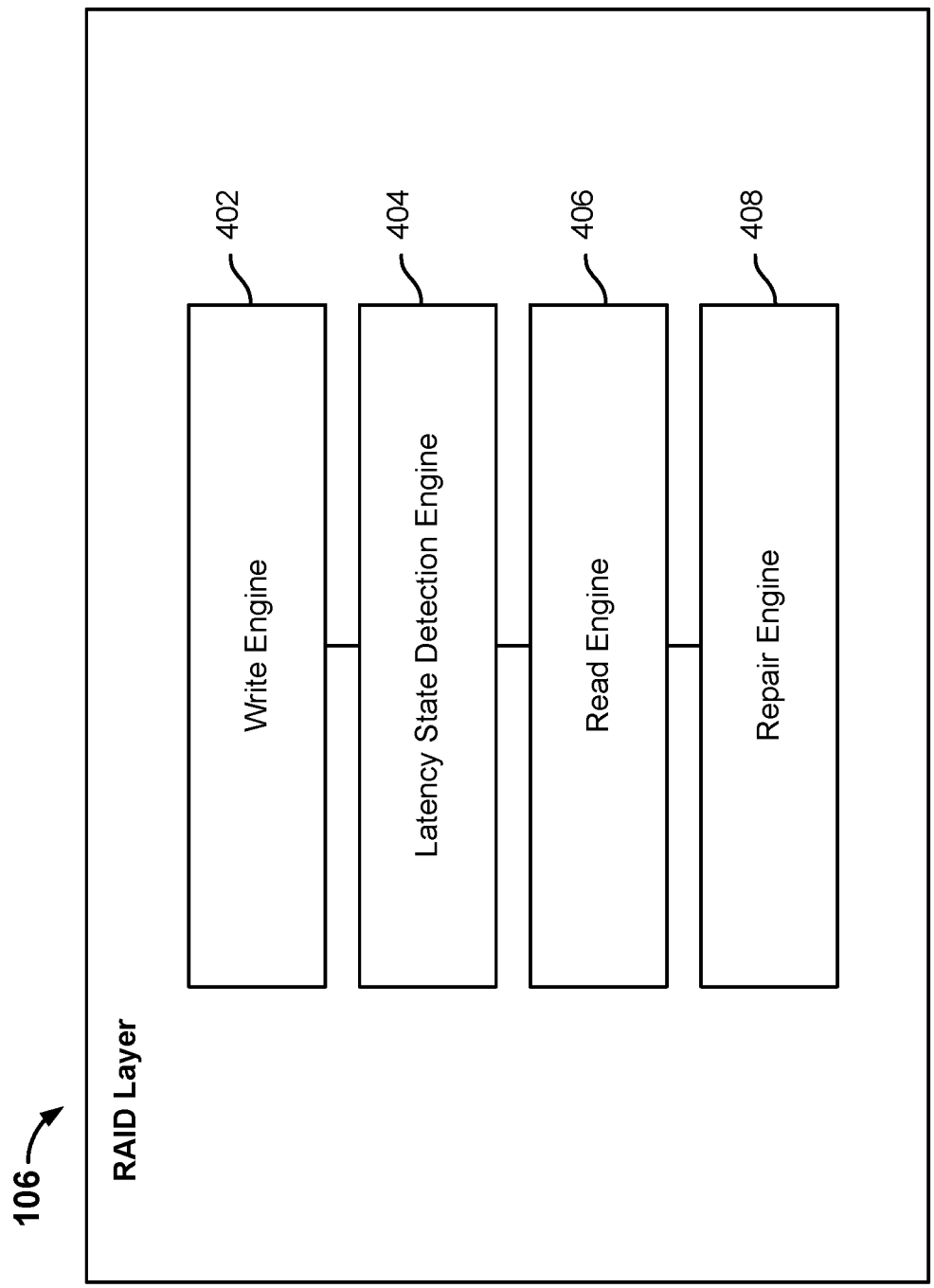
FIG. 4 is a diagram showing an example of a RAID layer in accordance to some embodiments.

FIG. 4 is a diagram showing an example of a RAID layer in accordance to some embodiments. In some embodiments, RAID layer 106 of system 100 of FIG. 1 is implemented using the example shown in FIG. 4. The example RAID layer includes write engine 402, latency state detection engine 404, read engine 406, and repair engine 408. In some embodiments, RAID layer 106 of system 100 of FIG. 1 is implemented using a RAID controller, such as one that is implemented by CPU and Main Memory Subsystem 202 of system 200 of FIG. 2, for example.

Write engine 402 is configured to receive write requests from applications (e.g., via a log-structured file system, such as FLOG 104 of system 100 of FIG. 1) and/or from a scrubber process that detects and repairs corrupt data in individual stripe units of the devices in the RAID group. A write request may include user data and write engine 402 is configured to compute parity data using at least a portion of the user data and generate parity data based at least in part on the RAID scheme that is employed. A write request that is received by write engine 402 may be a request to write data to a full stripe of the RAID group of devices. In some embodiments, if a write request for a full stripe write does not include enough data for a full stripe, the data included in the write request is collected in main memory until there are enough user data "blocks" to partially or mostly fill the user data stripe units of a stripe; at that point, the parity stripe units are computed, and the entire stripe gets written to the devices in the RAID group. Write engine 402 issues the write request to those (e.g., either all devices or a subset of the) devices of the RAID group to which the write request is directed. Write engine 402 is configured to receive indications of write successes or write failures from each device to which a write request was issued.

Conventionally, if write engine 402 does not receive any write success or failure acknowledgement from a device to which a write request was issued, write engine 402 keeps waiting for a lengthy timeout period, after which if no response is received, for example, write engine 402 may send an indication to the FLOG that the device has failed. However, in various embodiments described herein, latency state detection engine 404 is configured to detect whether fewer than all the devices to which the write request was issued have responded to write engine 402 with indications of write successes within a predetermined time interval. For example, the predetermined time interval may be configured by an administrator. In some embodiments, if latency state detection engine 404 detects that one device for which the write request was issued does not respond with a write success within the predetermined time interval but that all other devices, if any, for which the write request was issued did respond with a write success, latency state detection engine 404 is configured to determine that the non-responsive device is in a latency state (partially failed state).

In response to determining that a device of the RAID group is in a latency state, in various embodiments, latency state detection engine 404 is configured to generate at least one of the following data structures for the device in the latency state: a stripe unit data status data structure and a postponed writes queue. In various embodiments, at least one of the stripe unit data status data structure and the postponed writes queue is stored in a non-volatile memory so that the data structure may be recoverable after a restart or crash associated with the RAID controller. Latency state detection engine 404 is configured to store a corresponding value (flag) for each stripe unit of the device in the latency state in the stripe unit data status data structure that either indicates that the data stored in that stripe unit is current or stale (not current and should be repaired by being overwritten with current data). For example, the stripe unit data status data structure may be implemented using a bitmap. Latency state detection engine 404 is configured to store entries in the postponed writes queue, where each entry includes an identifier of a stripe unit of the device in the latency state for which data is stale and, potentially, the buffered data (or a reference to the location in memory of the buffered data) that is to be written to that stripe unit. For example, after latency state detection engine 404 determines that Device B included in the RAID group is in the latency state based on a determination that Device B did not respond within a predetermined time interval to a write request to write new data to stripe unit 2 of Device B, latency state detection engine 404 stores a value in the stripe unit data status data structure that indicates that stripe unit 2 of Device B stores stale data and/or stores a new entry in the postponed writes queue that indicates that stripe unit 2 of Device B is a stripe unit for which current data needs to be written (in a repair process of Device B) and potentially (e.g., a reference to) the buffered data to be written by the write request to the stripe unit 2 of Device B. So long as the Device B remains in the latency state, latency state detection engine 404 is configured to update values in the stripe unit data status data structure and add new entries in the postponed writes queue in response to new write requests that are to be processed at Device B.

Latency state detection engine 404 is further configured to (e.g., periodically) determine whether a device in the latency state in the RAID group has exited the latency state and is behaving normally or has entered the failed state. In various embodiments, latency state detection engine 404 is configured to periodically or in response to a checking event determine whether a device in the latency state in the RAID group meets the one or more criteria associated with normal behavior (e.g., the stripe unit data status data structure indicates that all stripe units of the device store current data and/or the postponed writes queue is empty). In the event that the device has resumed normal behavior, latency state detection engine 404 may delete the latency state related data structures that were generated for that device and send an indication to write engine 402 to treat the device as a normally functioning device. In various embodiments, latency state detection engine 404 is configured to periodically or in response to a checking event determine whether a device in the latency state in the RAID group meets the one or more criteria associated with a failed state (e.g., the postponed writes queue that is empty has reached a predetermined threshold number of entries and/or the device has remained in the latency state for at least a predetermined length of time). In the event that the device has entered the failed state, latency state detection engine 404 is configured to indicate to the RAID layer and/or the FLOG that the device should be failed so that the content stored on that device could be rebuilt (e.g., on the spare device of the RAID group).

After latency state detection engine 404 determines that a device in the RAID group is in the latency state, latency state detection engine 404 is configured to send an indication to write engine 402 that the device is currently in the latency state. As such, write engine 402 is configured to return a completed write (or some other successful indication) to the FLOG in response to subsequent write requests for which write engine 402 receives write success indications from devices other than the device in the latency state.

Read engine 406 is configured to process read requests from applications (e.g., via a log-structured file system, such as FLOG 104 of system 100 of FIG. 1). In various embodiments, a read request includes an offset within a specified stripe unit (on a specified device) within the RAID group. In response to receiving a read request, read engine 406 is configured to first determine whether the device that is specified by the read request is in a latency state. If the device that is specified by the read request is not in the latency state and is functioning normally, read engine 406 reads the requested data from the device and then returns the read data to the requestor. Otherwise, if the device that is specified by the read request is in the latency state, read engine 406 is configured to check at least one of the stripe unit data status data structure corresponding to that device and the postponed writes queue corresponding to that device to determine whether the stripe unit of the device that is specified by the read request stores current data. If the stripe unit of the device that is specified by the read request stores current data, read engine 406 is configured to either retrieve that current data associated with that stripe unit that is buffered in the postponed writes queue, if such buffered data is available, or reconstruct the current data associated with that stripe unit based at least in part on querying the other devices of the RAID group. Read engine 406 is configured to send the retrieved buffered data or the reconstructed data to the requestor.

Repair engine 408 is configured to repair a device that is in the latency state by writing current data to those stripe units of that device that do not yet store current data. In various embodiments, repair engine 408 is configured to repair a device that is in the latency state based on one or both of the stripe unit data status data structure corresponding to that device and the postponed writes queue corresponding to that device. Repair engine 408 is configured to determine which stripe unit(s) of the device in the latency state do not yet store current data from at least one of the stripe unit data status data structure corresponding to that device and the postponed writes queue corresponding to that device and then obtain the current data for each such stripe unit by either retrieving the current data associated with that stripe unit that is buffered in the postponed writes queue, if such buffered data is available, or reconstructing the current data associated with that stripe unit based at least in part on querying the other devices of the RAID group. After writing the current data to a stripe unit in the device that is in the latency state, repair engine 408 is configured to update at least one of the stripe unit data status data structure corresponding to that device and the postponed writes queue corresponding to that device to indicate that the particular stripe unit in the device now stores current data. In some embodiments, because repairing a device in the latency state may require performing reads to at least some of the devices in the RAID group, the rate at which a device in the latency state is repaired may be performed on a configured policy so as to load balance with incoming stripe write requests to the RAID group (e.g., a stripe unit of a device in the latency state could be repaired for every two new incoming stripe write requests).

Figure 5:
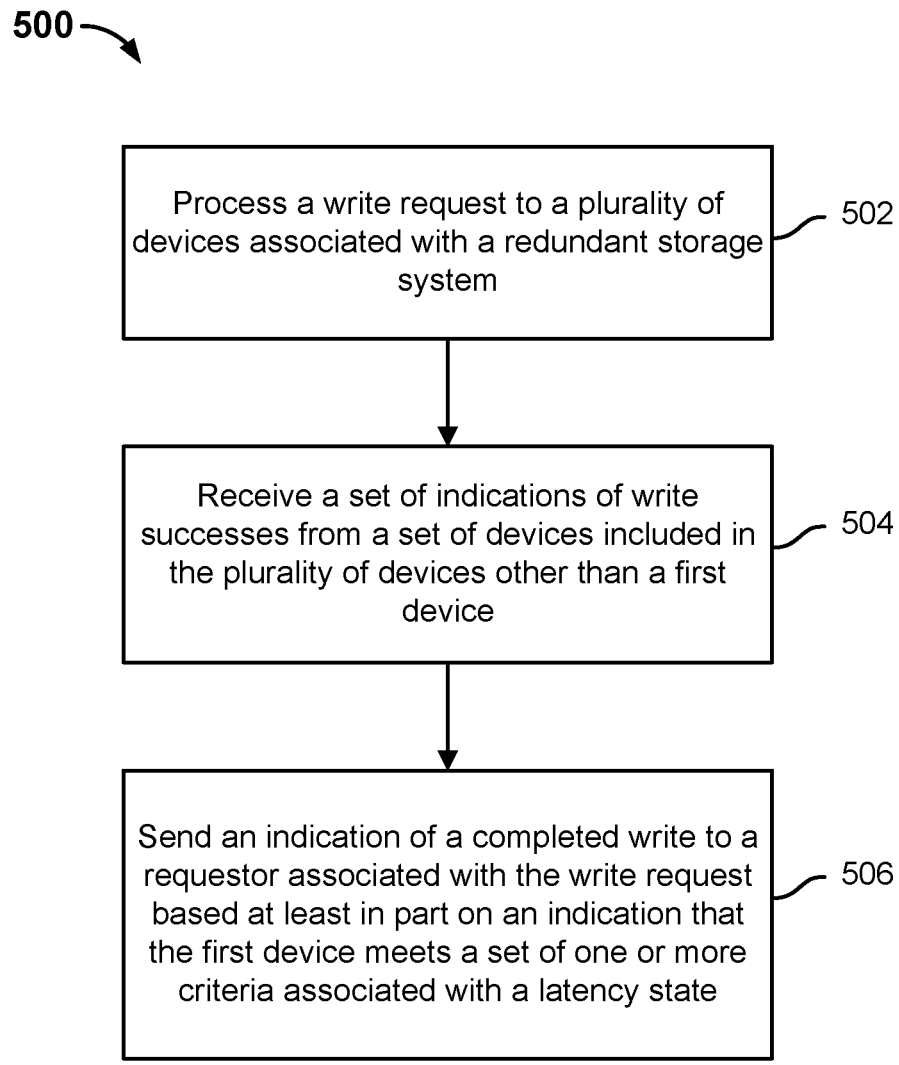
FIG. 5 is a flow diagram showing an embodiment of a process for handling a device in a latency state in a redundant storage system.

FIG. 5 is a flow diagram showing an embodiment of a process for handling a device in a latency state in a redundant storage system. In some embodiments, process 500 is implemented at system 100 of FIG. 1 and/or system 200 of FIG. 2.

At 502, a write request to a plurality of devices associated with a redundant storage system is processed. In various embodiments, the redundant storage system comprises a RAID group of devices. The write request may be directed to a full stripe (all devices) across the RAID group.

At 504, a set of indications of write successes is received from a set of devices included in the plurality of devices other than a first device. Write successes were received from fewer than all of the devices to which the write request was issued. For example, if the write request were for a full stripe, then write successes may be received from fewer than all of the devices in the RAID group.

At 506, an indication of a completed write is sent to a requestor associated with the write request based at least in part on an indication that the first device meets a set of one or more criteria associated with a latency state. In various embodiments, a device from which an indication of a write success was not received (e.g., within a predetermined time interval since the issuance of the write request to that device) meets a criterion associated with being in the latency state. After a device is designated as being in the latency state, the RAID layer returns an acknowledgement of a write request completion after determining that all other devices that were specified by the write request were successfully written to except the device that is in the latency state. In various embodiments, a stripe identifier associated with the stripe unit of the device in the latency state with which the write request did not succeed is indicated as not storing current data in at least one of the latency state related data structures (e.g., a stripe unit data status data structure and a postponed writes queue) that are generated and maintained for the device in the latency state.

As such, as described in process 500, a RAID group that includes a device in the latency state will not immediately cause the device to fail or stall the sending of an acknowledgement of a completed/successful write to the requestor of a write request to the RAID group. As such, in the event that the device in the latency state eventually resumes normal behavior, subsequent write requests to the RAID group are not delayed and the device that had been transiently experiencing latency is not unnecessarily failed (i.e., prevented from further use).

Figure 6:
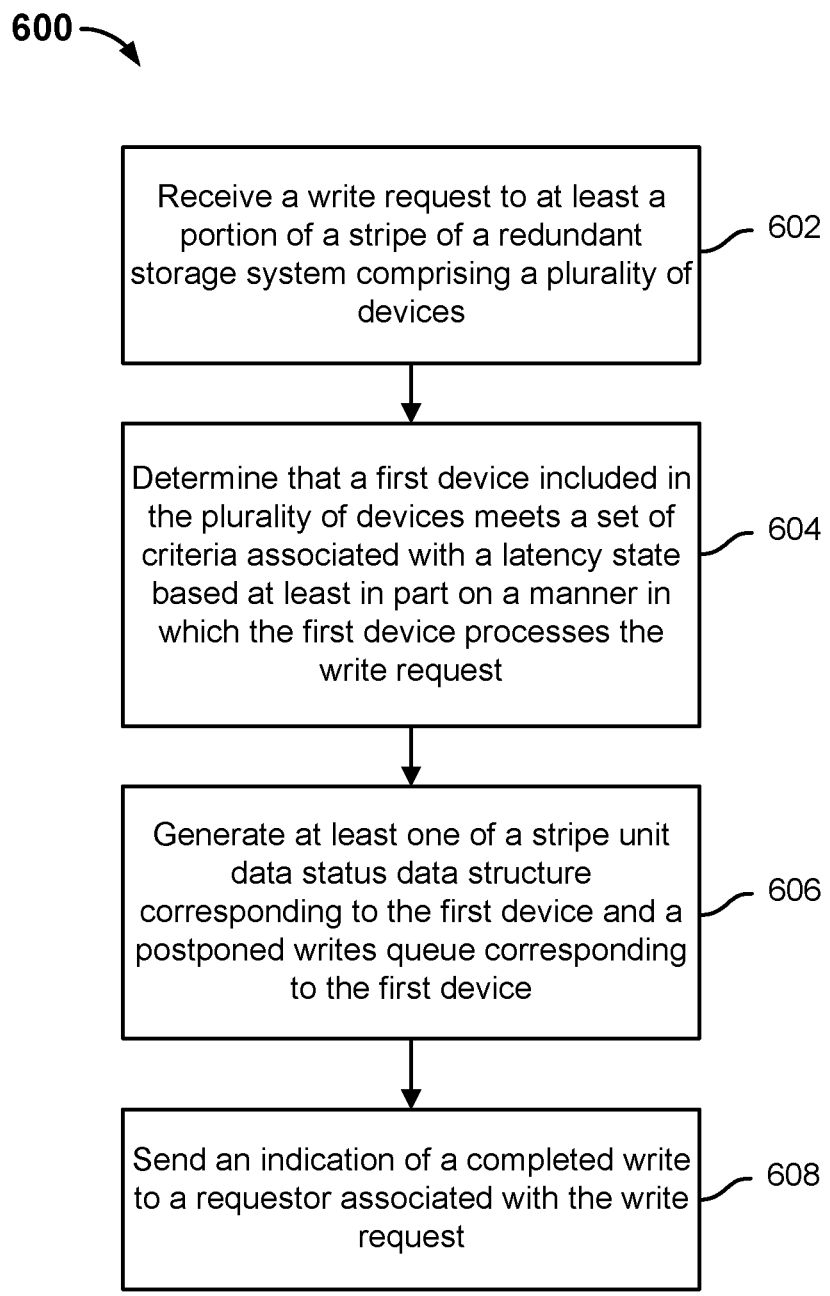
FIG. 6 is a flow diagram showing an embodiment of an example process for determining that a device included in a RAID group is in a latency state.

FIG. 6 is a flow diagram showing an embodiment of an example process for determining that a device included in a RAID group is in a latency state. In some embodiments, process 600 is implemented at system 100 of FIG. 1 and/or system 200 of FIG. 2. In some embodiments, process 500 of FIG. 5 may be implemented at least in part using process 600.

Process 600 describes an example of a process for determining when a device included in a RAID group of devices is currently in a latency state.

At 602, a write request to at least a portion of a stripe of a redundant storage system comprising a plurality of devices is received. The write request may be a full stripe write request or a partial stripe write request. The respective data that is requested to be written to each device is sent to the corresponding device.

At 604, a first device included in the plurality of devices that meets a set of criteria associated with a latency state is determined based at least in part on a manner in which the first device processes the write request. In various embodiments, the length of time that each device takes to respond with a write success indication is measured. For example, a criterion for a device being in the latency state is if the device does not respond to a write request within a predetermined time interval. For example, if a device to which the request was forwarded does not respond with a write success indication within a predetermined time interval associated with being in the latency state, it is determined that the device is in the latency state. There are various reasons in which a device may not respond (e.g., within the predetermined time interval) to a write request. For example, the device is performing internal administrative functions, a hardware component that connects to the device is behaving abnormally, and some but not all stripe units in the device are not currently accessible. In some embodiments, a lightweight indication or marker that the device is in the latency state is stored in volatile or non-volatile storage. The device is treated as being in the latency state for subsequent write and read requests that are directed (at least in part) to that device until it is determined that the device is either recovered and behaving normally or is in a failed state.

At 606, at least one of a stripe unit data status data structure corresponding to the first device and a postponed writes queue corresponding to the first device is generated. Each of the stripe unit data status data structure and the postponed writes queue is stored with an identifier associated with the device in the latency state and also a time at which it was determined that the device is in the latency state. In various embodiments, at least one of the stripe unit data status data structure and the postponed writes queue is stored in a non-volatile storage so that it can be recovered after a crash or a failover occurs with respect to the current RAID controller. As subsequent write requests are directed to the device in the latency state, the stripe unit data status data structure and the postponed writes queue are used to store information associated with which stripe units of the device in the latency state do or do not yet store current data and potentially, current data (from a recent write request) to be stored in which stripe units of the device in the latency state.

In some embodiments, in addition to updating the stripe unit data status data structure and/or the postponed writes queue, for a new write request that is not written at the device in the latency state, the data associated with the write request that is to be written to the device is also written to a corresponding stripe unit in a spare device of the RAID group. The data written to the spare device can be used later such as to repair stripe units that were not written to because the device was in a latency state or because the write was postponed. In various embodiments, the data is written to a corresponding location in the spare device (e.g., a corresponding stripe unit or mapping to an offset stripe unit location). Later, the data is copied from the spare drive to the drive that is in the latency state. Because the location is known, the data need not be reconstructed and can simply be copied from the known location.

At 608, an indication of a completed write is sent to a requestor associated with the write request. After a device is designated as being in the latency state, the RAID layer returns an acknowledgement of a write request completion after determining that all other devices that were specified by the write request were successfully written to except the device that is in the latency state. In various embodiments, a stripe identifier associated with the stripe unit of the device in the latency state with which the write request did not succeed is indicated as not storing current data in at least one of the stripe unit data status data structure and the postponed writes queue.

Figure 7:
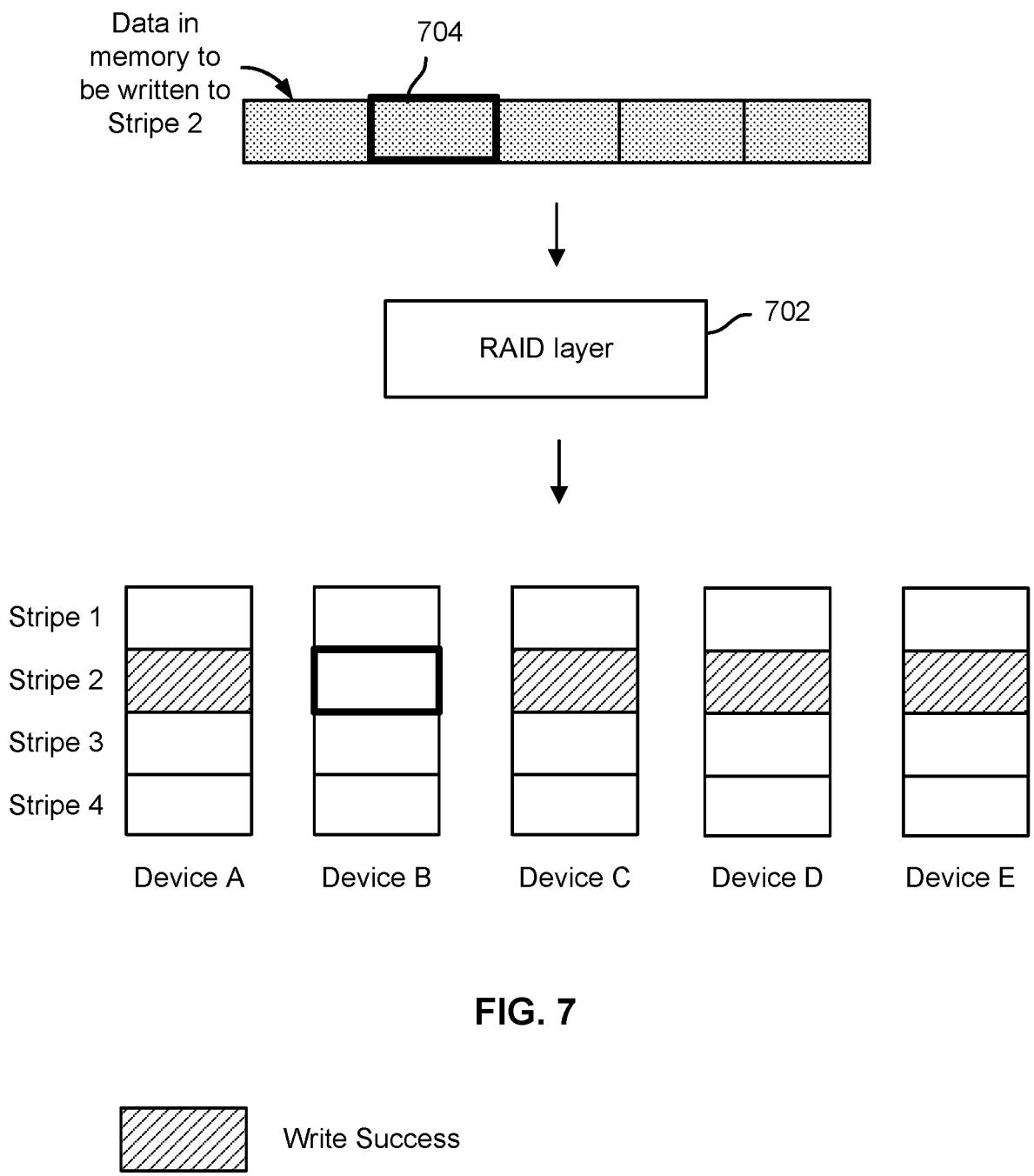
FIG. 7 shows an example of a RAID group, a RAID layer, and an in-memory buffer for storing data that is to be written to a stripe of the RAID group.

FIG. 7 shows an example of a RAID group, a RAID layer, and an in-memory buffer for storing data that is to be written to a stripe of the RAID group. FIG. 7 includes RAID layer 702 that is configured at least in part to receive write requests from an application and to send acknowledgements regarding whether the requested data has been successfully written to the RAID group. In the example of FIG. 7, the RAID group includes the five devices of Device A, Device B, Device C, Device D, and Device E. The RAID group stores data in the four stripes of Stripe 1, Stripe 2, Stripe 3, and Stripe 4. Each of Device A, Device B, Device C, Device D, and Device E includes a corresponding stripe unit for each stripe. Data associated with a new write (e.g., issued by an application) to a full stripe (all stripe units of a stripe) of the RAID group is stored in a buffer in memory until it is written to the RAID group. In the example of FIG. 7, the buffer in memory holds data for a new full stripe write to Stripe 2 of the RAID group.

As shown in the example of FIG. 7, after RAID layer 702 forwarded the buffered data to be written to the RAID group at Stripe 2, RAID layer 702 received indications of write successes from Device A, Device C, Device D, and Device E but not Device B. Typically, a message of a success of a full stripe write request is not returned by a RAID layer unless the requested data has been successfully written to the relevant stripe of each device in the RAID group. In contrast, in accordance to some embodiments as described herein, if an indication of a write success is not received from Device B within a predetermined time interval, RAID layer 702 determines that Device B is in the latency state, and if RAID layer 702 determines that write successes have been received from every other device in the RAID group, RAID layer 702 returns a message of a success of a full stripe write request to the requestor. In response to determining that the Device B is in the latency state, a stripe unit data status data structure and a postponed writes queue are generated for the Device B. Furthermore, the stripe unit data status data structure is caused to store a value that indicates that Stripe 2 of Device B does not store current data and the postponed writes queue is caused to store a new entry indicating that Stripe 2 of Device B needs to be updated with current data. The postponed writes queue, in some embodiments, may even buffer a stripe unit of data 704 that should have been written to Stripe 2 of Device B.

Figure 8:
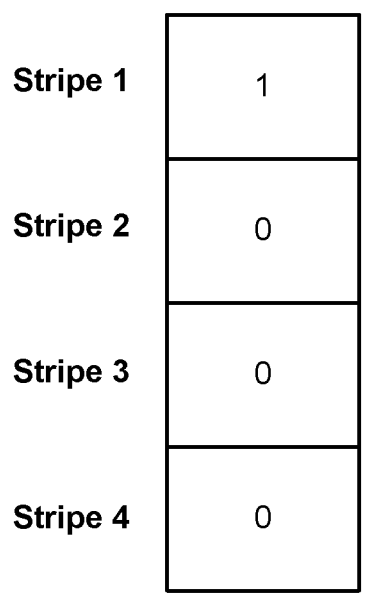
FIG. 8 is a diagram showing an example of a stripe unit data status data structure.

FIG. 8 is a diagram showing an example of a stripe unit data status data structure. In the example shown in FIG. 8, stripe unit data status data structure 800 is implemented as a bitmap. As shown in the example of FIG. 8, stripe unit data status data structure 800 is stored with an identifier (e.g., a UUID) of the device included in a RAID group to which it was associated (Device B) and also the time at which it was determined that Device B is in the latency state ($13^{th}$ hour, $20^{th}$ minute, and $54^{th}$ second on Nov. 15, 2017). Stripe unit data status data structure 800 indicates that stripe unit 1 of Device B is the only stripe unit of Device B that stores current data and the remaining stripe units (2, 3, and 4) each stores stale (not current) data. Stripe unit 1 of Device B may store current data because it has been repaired by a process that repairs stripe units of devices in the latency state, which will be described in further detail below. Alternatively, stripe unit 1 of Device B may store current data because stripe unit 1 has not been affected by any write requests that have been directed to Device B after Device B was determined to be in the latency state.

Figure 9:
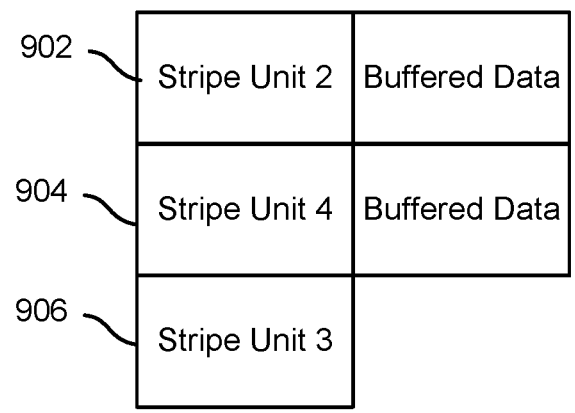
FIG. 9 is a diagram showing an example of a postponed writes queue.

FIG. 9 is a diagram showing an example of a postponed writes queue. In the example shown in FIG. 9, postponed writes queue 900 is implemented as a queue data structure. Alternatively, a postponed writes queue may be implemented as a set of entries. As shown in the example of FIG. 9, postponed writes queue 900 is stored with an identifier (e.g., a UUID) of the device included in a RAID group to which it was associated (Device B) and also the time at which it was determined that Device B is in the latency state ($13^{th}$ hour, $20^{th}$ minute, and $54^{th}$ second on Nov. 15, 2017). Each entry (e.g., 902, 904, and 906) of postponed writes queue 900 comprises an identifier associated with a certain stripe/stripe unit within Device B on which current data is to be stored. In addition to storing identifiers associated with a certain stripe/stripe unit within Device B on which current data is to be stored, some entries (e.g., 902 and 904) additionally store (or store references to) buffered data (e.g., in memory) that is to be stored at the corresponding identified stripe units of Device B. For example, entry 902 may store the identifier of stripe unit 2 in Device B and also a pointer to a location in memory at which the current data that is to be stored to stripe unit 2 in Device B is currently buffered. In some embodiments, only a predetermined portion (e.g., number of entries or percentage of the overall number of entries) within a postponed writes queue is permitted to be associated with buffered data (e.g., because storing buffered data corresponding to stripe units of a device in the latency state may consume significant storage space). For example, only a predetermined number (e.g., 100 or some other tunable/configurable value) of entries of a postponed writes queue may store buffered data while the buffered data of the remaining entries are reclaimed/deleted.

In some embodiments, a postponed writes queue may store more than one entry corresponding to the same stripe unit of the device in the latency state in response to multiple write requests being made to that device while the device was in the latency state. In some embodiments, the entries of the postponed writes queue are stored in an order that preserves the chronological order in which the related new writes were issued to the RAID group. In the event where there is more than one entry corresponding to the same stripe unit of the device in the latency state in the posted writes queue, when the postponed writes queue is used to repair the device in the latency queue, only the most recent entry pertaining to each stripe unit that is to be repaired is read from the postponed writes queue while the older entries pertaining to the same stripe unit are deleted/removed from the queue. In some embodiments, such as postponed writes queue 900 that is shown in FIG. 9, the postponed writes queue stores only the most recently generated entry for each stripe unit of the device in the latency state for which current data needs to be written. For example, for a new entry that is added to postponed writes queue 900, any previously stored entry in postponed writes queues 900 that is related to the same stripe unit is removed from postponed writes queues 900. Each stripe unit of the device in the latency state for which current data needs to be written that is identified in the postponed writes queue is also indicated to not have current data in the stripe unit data status data structure. In various embodiments, after a stripe unit of the device in the latency state is repaired to store current data, the one or more entries of the postponed writes queue that correspond to that stripe unit (e.g., entries that store the stripe unit identifier of that stripe unit) are removed from the postponed writes queue.

Figure 10:
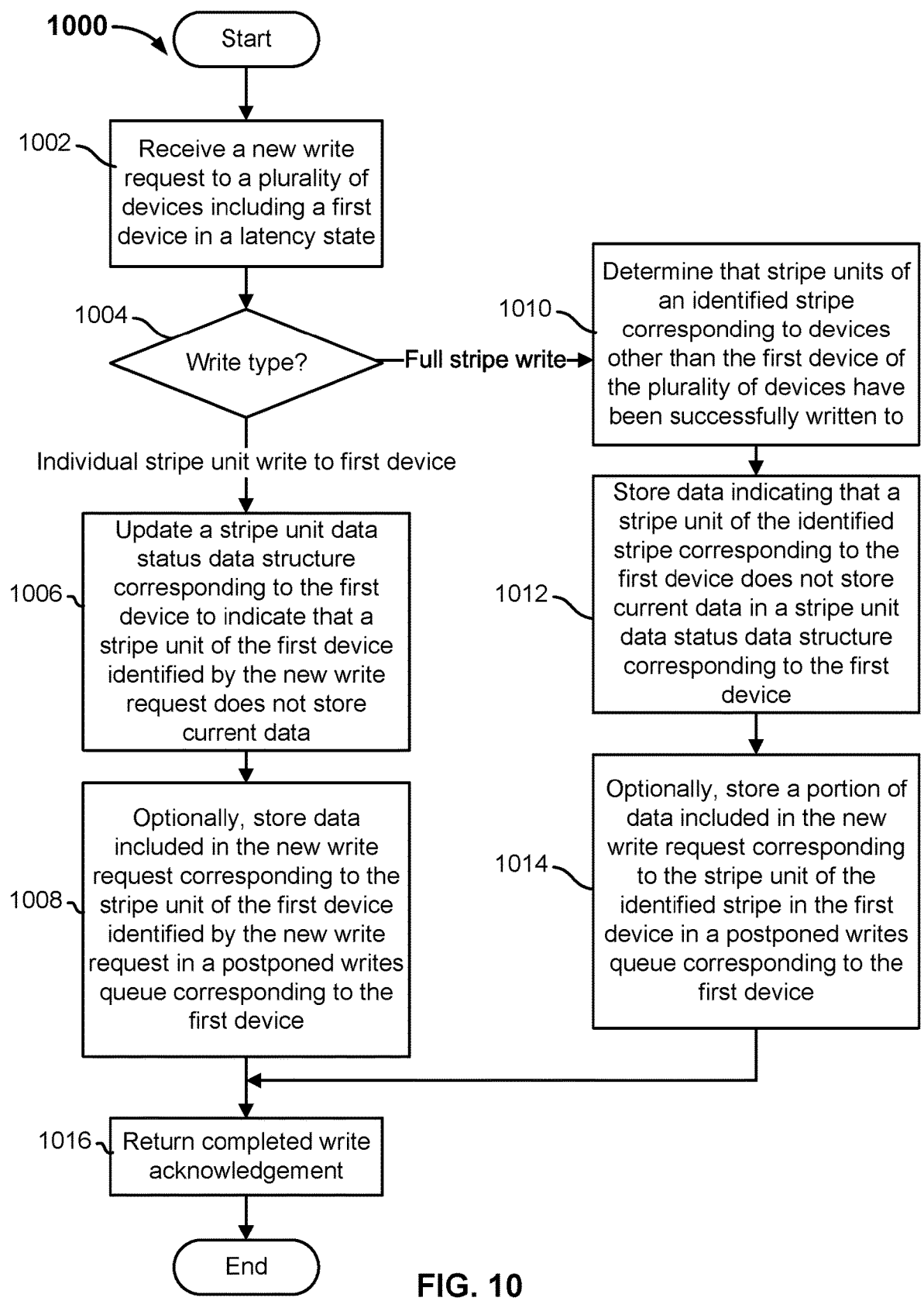
FIG. 10 is a flow diagram showing an example process for processing a write request to a RAID group that includes a device that is in the latency state.

FIG. 10 is a flow diagram showing an example process for processing a write request to a RAID group that includes a device that is in the latency state. In some embodiments, process 1000 is implemented at system 100 of FIG. 1 and/or system 200 of FIG. 2.

At 1002, a new write request to a plurality of devices including a first device in a latency state is received. A new write request to at least one device of a RAID group is received. The RAID group has already been determined to include at least one device (which is referred to as the "first device" in process 1000) that is in the latency state (e.g., using a process such as process 600 of FIG. 6).

At 1004, a write type associated with the new write request is determined. In the event that the new write request is for a full stripe write, control is transferred to 1010. Otherwise, in the event that the new write request is for an individual stripe unit write to the first device, control is transferred to 1006.

At 1006, a stripe unit data status data structure corresponding to the first device is updated to indicate that a stripe unit of the first device identified by the new write request does not store current data. Because it has already been determined prior to process 1000 that the first device is in the latency state, the previously generated stripe unit data status data structure corresponding to the first device is updated to indicate, if it does not already, that the stripe unit of the first device that is identified by the new write request does not store current data.

At 1008, optionally, data included in the new write request corresponding to the stripe unit of the first device identified by the new write request is stored in a postponed writes queue corresponding to the first device. A new entry that identifies the stripe unit of Device B that is indicated in the new write request is added to a postponed writes queue corresponding to the first device. In the event that the postponed writes queue corresponding to the first device is able to store or point to a buffer (in memory) of the data that is requested to be written to the identified stripe unit of the first device, the portion of the data of the new write request that pertains to a stripe unit of the first device is buffered and a reference (e.g., a pointer) to the buffered data is also added to the new entry in the postponed writes queue.

At 1010, it is determined that stripe units of an identified stripe corresponding to devices other than the first device of the plurality of devices have been successfully written to. It is determined that devices other than the first device of the RAID group have sent indications of write successes.

At 1012, data indicating that a stripe unit of the identified stripe corresponding to the first device does not store current data is stored in a stripe unit data status data structure corresponding to the first device. Because it has already been determined prior to process 1000 that the first device is in the latency state, the previously generated stripe unit data status data structure corresponding to the first device is updated to indicate, if it does not already, that the stripe unit of the first device that is identified by the new write request does not store current data.

At 1014, optionally, a portion of data included in the new write request corresponding to the stripe unit of the identified stripe in the first device identified by the new write request is stored in a postponed writes queue corresponding to the first device. A new entry that identifies the stripe unit of Device B that is indicated in the new write request is added to a postponed writes queue corresponding to the first device. In the event that the postponed writes queue corresponding to the first device is able to store or point to a buffer (in memory) of the data that is requested to be written to the identified stripe unit of the first device, the data of the new write request that pertains to the first device is buffered and a reference (e.g., a pointer) to the buffered data is also added to the new entry in the postponed writes queue.

At 1016, a completed write acknowledgment is returned. Even though the first device was not written to, because the first device is known to be in the latency state, an acknowledgement of a write completion is returned to the requestor.

As described in process 1000, once a device of the RAID group is in the latency state, any new stripe writes will only write to other devices in the stripe, and forego writing to the device in the latency state before returning a success write acknowledgment to the issuers (e.g., one or more applications) of the new stripe writes.

Figure 11:
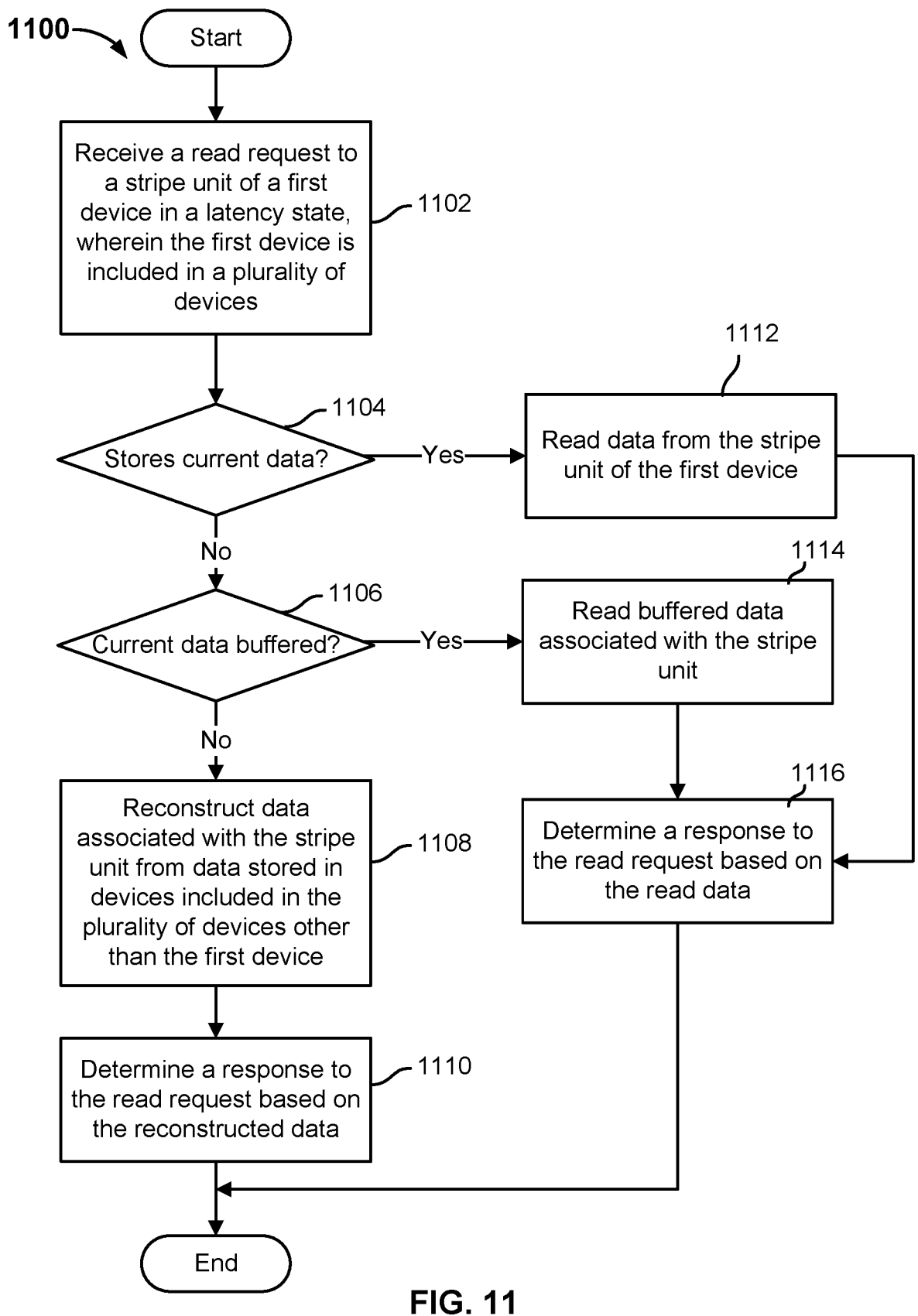
FIG. 11 is a flow diagram showing an example process for processing a read request to a RAID group that includes a device that is in the latency state.

FIG. 11 is a flow diagram showing an example process for processing a read request to a RAID group that includes a device that is in the latency state. In some embodiments, process 1100 is implemented at system 100 of FIG. 1 and/or system 200 of FIG. 2.

At 1102, a read request to a stripe unit of a first device in a latency state is received, wherein the first device is included in a plurality of devices. In various embodiments, the plurality of devices forms a RAID group. In various embodiments, the read request includes one or more of the following: a device identifier (e.g., UUID), a stripe identifier, an offset within a stripe unit within the identified stripe unit of the identified device, and a size associated with the requested data.

At 1104, it is determined whether the stripe unit of the first device stores current data. In the event that the stripe unit of the first device stores current data, control is transferred to 1112, at which data is read from the stripe unit of the first device. If the stripe unit identified by the read request is indicated by the stripe unit data status data structure to store current data, then that stripe unit can be directly read. Otherwise, in the event that the stripe unit of the first device does not store current data, control is transferred to 1106. If the stripe unit identified by the read request is indicated by the stripe unit data status data structure to not store current data, then that stripe unit cannot be directly read.

At 1106, it is determined whether the current data associated with the stripe unit of the first device is buffered (e.g., in memory). In the event that the current data associated with the stripe unit of the first device is buffered, control is transferred to 1114, at which the buffered data is either stored in or referenced by an entry of the postponed writes queue corresponding to the first device. If the data of the stripe unit identified by the read request is buffered in memory, then the memory is read for the buffered data. Otherwise, in the event that the current data associated with the stripe unit of the first device is not buffered, control is transferred to 1108.

At 1108, data associated with the stripe unit is reconstructed from data stored in devices included in the plurality of devices other than the first device. Given the redundant characteristics of a RAID group, the data of the stripe unit identified by the read request can be reconstructed by querying the other, normally functioning devices of the RAID group for the relevant user and/or parity data and using the queried data to generate the data of the stripe unit identified by the read request.

At 1110, a response to the read request is determined based on the reconstructed data. The portion of the reconstructed data that is relevant to the read request is returned to the requestor.

At 1116, a response to the read request is determined based on the read data. The portion of the read data that is relevant to the read request is returned to the requestor.

Figure 12:
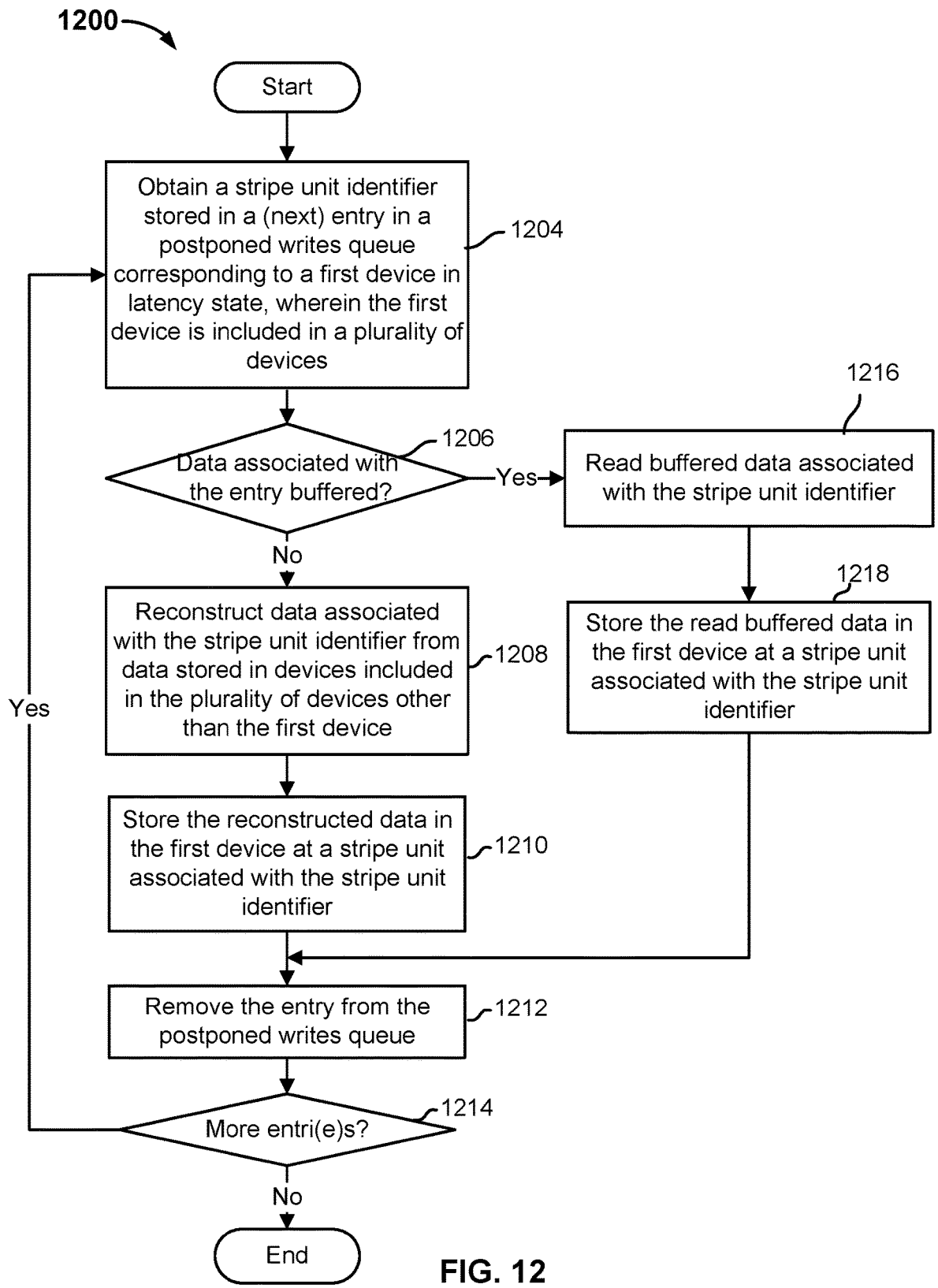
FIG. 12 is a flow diagram showing an example process for repairing a device in a latency state using a postponed writes queue corresponding to the device.

FIG. 12 is a flow diagram showing an example process for repairing a device in a latency state using a postponed writes queue corresponding to the device. In some embodiments, process 1200 is implemented at system 100 of FIG. 1 and/or system 200 of FIG. 2.

Process 1200 describes an example process of repairing a device in a latency state using only a postponed writes queue corresponding to the device.

At 1204, a stripe unit identifier stored in a (next) entry in a postponed writes queue corresponding to a first device in a latency state is obtained, wherein the first device is included in a plurality of devices. In various embodiments, the plurality of devices forms a RAID group. An entry of the postponed writes queue that was stored with the identifier (e.g., UUID) of the device in the latency state is read and a stripe unit identifier is obtained from the entry. As described above, an entry of the postponed writes queue identifies a stripe unit of the device in the latency state that does not store current data and that therefore needs to be repaired to store current data.

At 1206, it is determined whether data associated with the entry is buffered. In the event that the data associated with the entry is buffered, control is transferred to 1216. Otherwise, in the event that the data associated with the entry is not buffered, control is transferred to 1208. As described above, an entry of the postponed writes queue may include or point to buffered data (e.g., stored in memory) that is to be stored in a corresponding stripe unit of the device in the latency state as current data.

At 1208, data associated with the stripe unit identifier is reconstructed from data stored in devices included in the plurality of devices other than the first device. As mentioned above, not every entry of the postponed writes queue may include or point to buffered data (e.g., stored in memory). Therefore, in the event that buffered data that is to be stored in a corresponding stripe unit of the device in the latency state as current data is not available, then the data that is to be stored in a corresponding stripe unit of the device in the latency state as current data is to be reconstructed by querying the other, normally functioning devices of the RAID group for the relevant user and/or parity data and using the queried data to generate the data of the stripe unit identified by the stripe unit identifier obtained from the entry of the postponed writes queue.

At 1210, the reconstructed data is stored in the first device at a stripe unit associated with the stripe unit identifier. The reconstructed data is stored in the identified stripe unit in the device in the latency state as current data.

At 1212, the entry is removed from the postponed writes queue. After current data is stored in the identified stripe unit in the device in the latency state, the stripe unit is considered to be repaired and as such, the corresponding entry is removed from the postponed writes queue.

At 1214, it is determined whether there is at least one more entry included in the postponed writes queue. In the event that there is at least one more entry included in the postponed writes queue, control is returned to 1204. Otherwise, in the event that there is not at least one more entry included in the postponed writes queue, process 1200 ends. It is determined whether there are additional entries in the postponed writes queue that indicate that other stripe units of the device in the latency are to be repaired.

At 1216, buffered data associated with the stripe unit identifier is read, e.g., from memory.

At 1218, the read buffered data is stored in the first device at a stripe unit associated with the stripe unit identifier. The read buffered data is stored in the identified stripe unit in the device in the latency state as current data.

Figure 13:
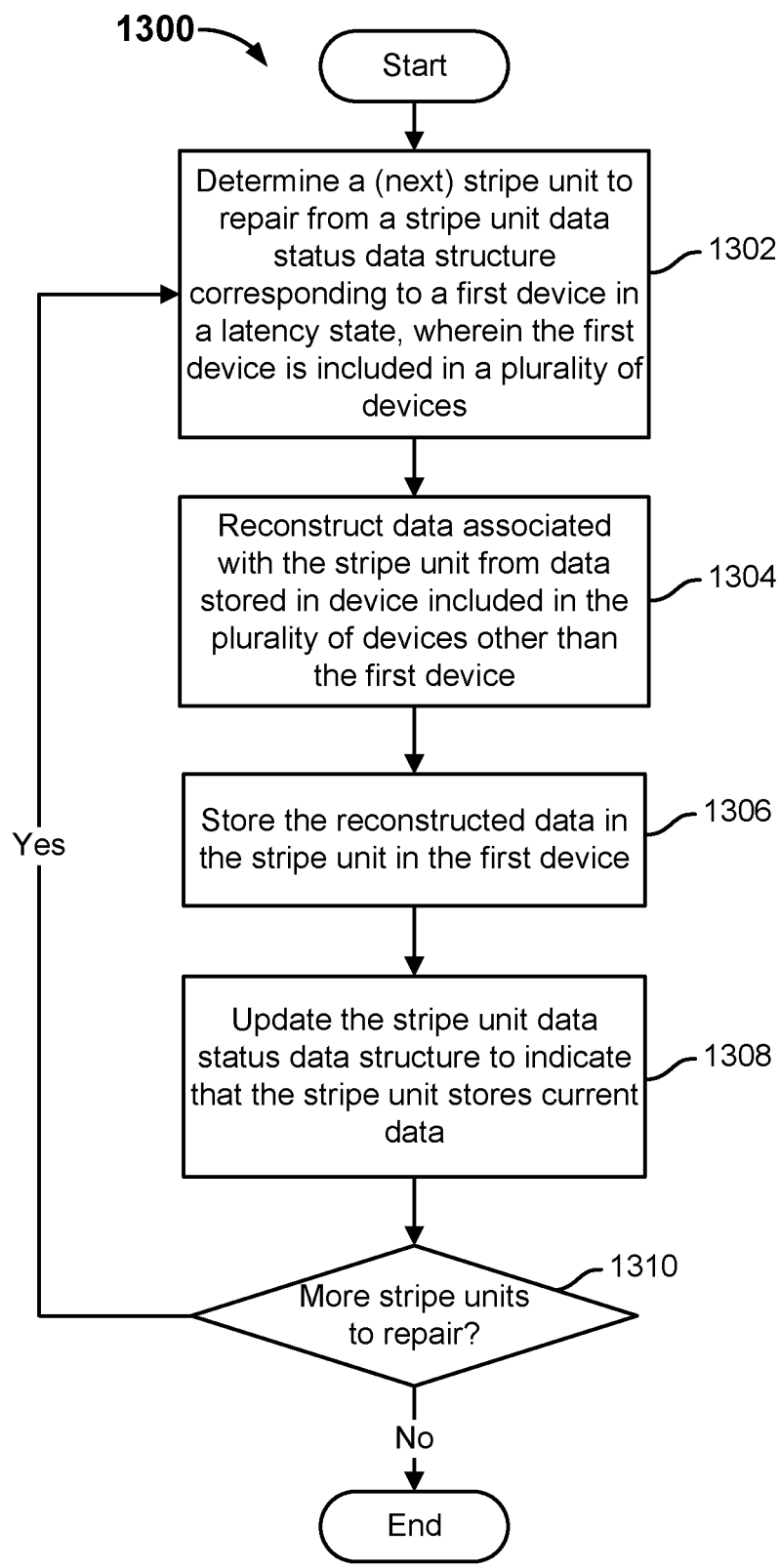
FIG. 13 is a flow diagram showing an example process for repairing a device in a latency state using a stripe unit data status data structure corresponding to the device.

FIG. 13 is a flow diagram showing an example process for repairing a device in a latency state using a stripe unit data status data structure corresponding to the device. In some embodiments, process 1300 is implemented at system 100 of FIG. 1 and/or system 200 of FIG. 2.

Process 1300 describes an example process of repairing a device in a latency state using only a stripe unit data status data structure corresponding to the device. In some embodiments, process 1300 may be implemented alternatively to process 1200 of FIG. 12.

At 1302, a (next) stripe unit to repair is determined from a stripe unit data status data structure corresponding to a first device in a latency state, wherein the first device is included in a plurality of devices. In various embodiments, the plurality of devices forms a RAID group. As described above, the stripe unit data status data structure corresponding to a device in a latency state stores a value for each stripe unit of the device that indicates whether that corresponding stripe unit does or does not store current data. Each of those stripe units for which the stripe unit data status data structure indicates as not storing current data is to be repaired to store current data.

At 1304, data associated with the stripe unit is reconstructed from data stored in devices included in the plurality of devices other than the first device. The data that is to be stored in a corresponding stripe unit of the device in the latency state as current data is to be reconstructed by querying the other, normally functioning devices of the RAID group for the relevant user and/or parity data and using the queried data to generate the data of the stripe unit identifier that is indicated by the stripe unit data status data structure as not yet storing current data.

At 1306, the reconstructed data is stored in the first device at the stripe unit. The reconstructed data is stored in the stripe unit in the device in the latency state as current data.

At 1308, the stripe unit data status data structure is updated to indicate that the stripe unit stores current data. Because the stripe unit has been repaired to store current data, the stripe unit data status data structure is updated to store a value corresponding to the repaired stripe unit that indicates that the stripe unit stores current data.

At 1310, it is determined whether there is at least one more stripe unit that is indicated by the stripe unit data status data structure that needs to be repaired. In the event that there is at least one stripe unit that is to be repaired, control is returned to 1302. Otherwise, in the event that there is not at least one stripe unit that is to be repaired, process 1300 ends.

While process 1200 of FIG. 12 and process 1300 of FIG. 13 describe alternative techniques of repairing a device in a latency state using either only a postponed writes queue or only a stripe unit data status data structure corresponding to the device in the latency state, in practice, a combination of both of the postponed writes queue and stripe unit data status data structure may be used to repair the device in the latency state.

In various embodiments, different policies could be adopted for when stripe units of a device in a latency state get repaired. In some embodiments, stripe units of a device in a latency state get repaired based on a timer driven basis. In some embodiments, stripe units of a device in a latency state are repaired based on an eager policy (i.e., the stripe units are repaired as fast as possible) or load-balanced with incoming stripe writes (e.g., a stripe unit in a device in a latency state could be repaired for every two new incoming stripe writes).

Figure 14:
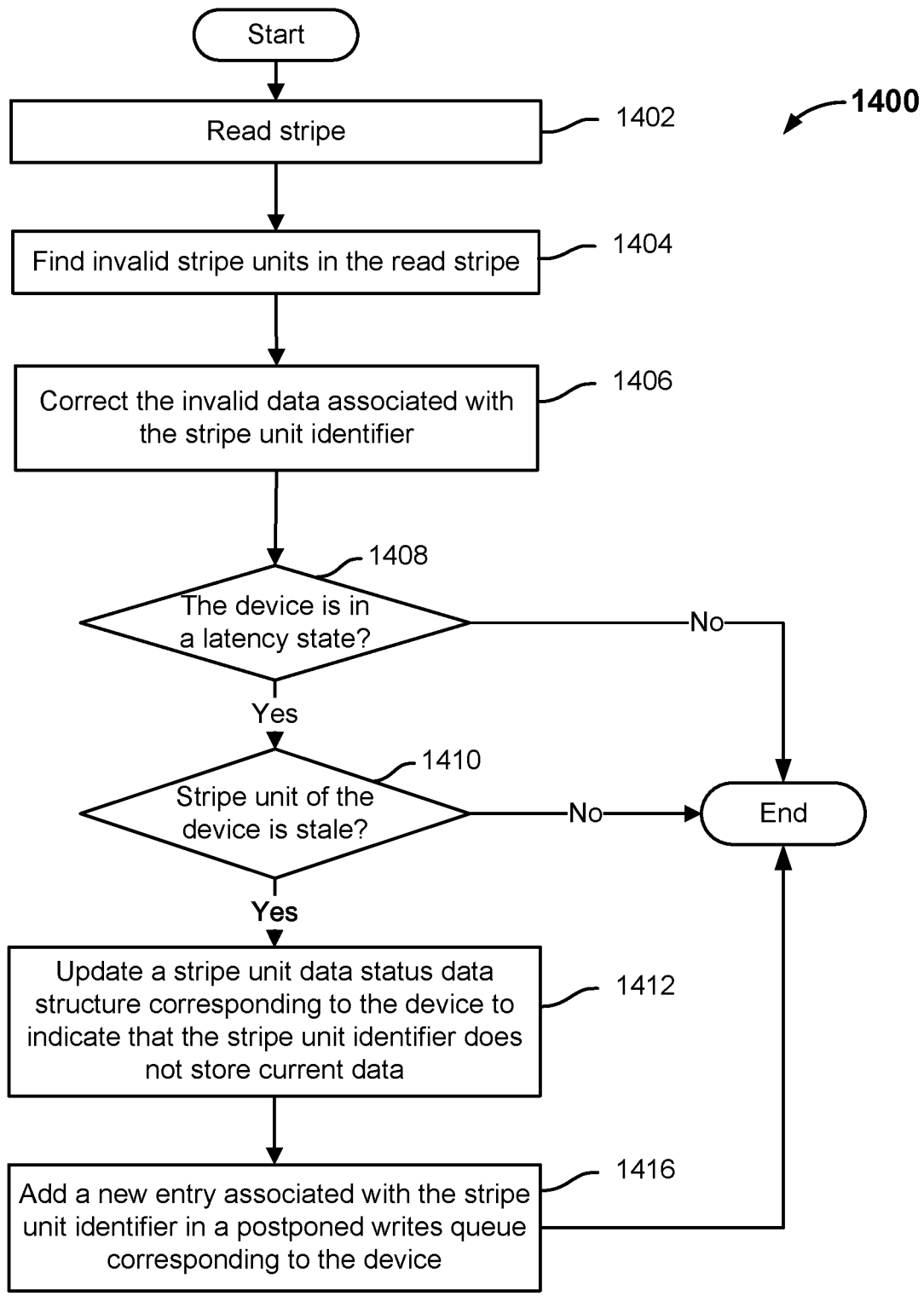
FIG. 14 is a flow diagram showing an example process for performing a scrubber process with respect to a device in a latency state.

FIG. 14 is a flow diagram showing an example process for performing a scrubber process with respect to a device in a latency state. In some embodiments, process 1400 is implemented at system 100 of FIG. 1 and/or system 200 of FIG. 2.

At 1402, a stripe is read. The process reads a stripe by reading all stripe units in a group of devices to obtain the stripe. A scrubber processor traverses through stripes to determine which stripe units, if any are invalid.

At 1404, invalid stripe units in the read stripe are found. Invalid stripe units include corrupt stripe units and/or stale stripe units. A corrupt stripe unit is a stripe unit whose data is corrupted. A stale stripe is a stripe unit whose data is obsolete. In various embodiments, to determine whether a stripe unit is corrupt, a checksum such as a cyclic redundancy check (CRC) is performed against the data stored in the stripe unit to determine which stripe units, if any, are corrupt. In various embodiments, the CRC is part of the stripe unit, e.g., stored with the stripe unit. In various embodiments, the non-corrupt stripe units are checked to see if they are stale. In various embodiments, to determine whether a stripe unit contains stale data, the UUIDs of the stripe units in a stripe are compared. A UUID is typically assigned at the time data is written to a stripe unit. Thus, if there is a mismatch between UUIDs of stripe units, this can indicate stale data. For example, if one of the stripe units has a UUID different from the other stripe units, than that stripe unit contains stale. Data may be stale for a variety of reasons. For example, data may be intentionally not written to a device in a latency state. As another example, an unsuccessful attempt to write data may result in stale data because old data was not successfully rewritten over.

At 1406, invalid data associated with the stripe unit identifier is corrected using conventional techniques. A stripe unit can include corrupt and/or stale data. For example, corrupt data is corrected and stale data is discarded and replaced with current data. Typically, if a stripe unit is detected to store corrupt data, this is corrected by reading the other stripe units to reconstruct the corrupted stripe unit. After reconstruction, the CRC is calculated to verify that the data has been properly reconstructed.

At 1408, it is determined whether the device is in a latency state. In the event that the device is not in the latency state, the process 1400 ends. Otherwise, in the event that the device is in the latency state, control is transferred to 1410. In some embodiments, whether the device is in a latency state is determined by checking whether there is a stored indication or marker that denotes that the device is in a latency state.

At 1410, it is determined whether the stripe unit of the device is stale. For example, data is stale if it is not current. In the event that the stripe unit is indicated to be stale, control is transferred to 1412. Otherwise, in the event that the stripe unit is not indicated to be stale, process 1400 ends. If the device for which the corrupted stripe unit is detected is in the latency state, then a stripe unit data status data structure and/or a postponed writes queue is maintained for that device. The stripe unit data status data structure corresponding to the device is retrieved (e.g., from non-volatile memory) and checked to determine whether the stripe unit that is identified to store corrupted data is a stripe unit that is also indicated by the stripe unit data status data structure to store current data. If the stripe unit data status data structure indicates that the stripe unit should store current data, then control is transferred to 1412. However, if the stripe unit data status data structure does not store current data, then process 1400 ends because it is assumed that a repair process (e.g., process 1200 of FIG. 12 or process 1300 or FIG. 13) will eventually use either the stripe unit data status data structure and/or the postponed writes queue to repair this stripe unit.

At 1412, a stripe unit data status data structure corresponding to the device is updated to indicate that the stripe unit associated with the stripe unit identifier does not store current data. If the stripe unit data status data structure indicates that the stripe unit should store current data but the scrubber process has determined that the stripe unit does not store current data, then it is determined that the stripe unit data status data structure has stored an incorrect value for the stripe unit. As such, the stripe unit data status data structure is updated to include for the stripe unit a value that indicates that the stripe unit does not store current data.

At 1416, a new entry associated with the stripe unit identifier is added in a postponed writes queue corresponding to the device. Because it is determined that the stripe unit is associated with corrupt data, a new entry that includes at least the stripe unit's stripe unit identifier is stored in the postponed writes queue corresponding to the device in the latency state. The new entry in the postponed writes queue will ensure that if the postponed writes queue were used to repair the device (e.g., using a process such as process 1200 of FIG. 12), that stripe unit can be repaired to store the current data. In some embodiments, 1416 is optionally performed.

Figure 15:
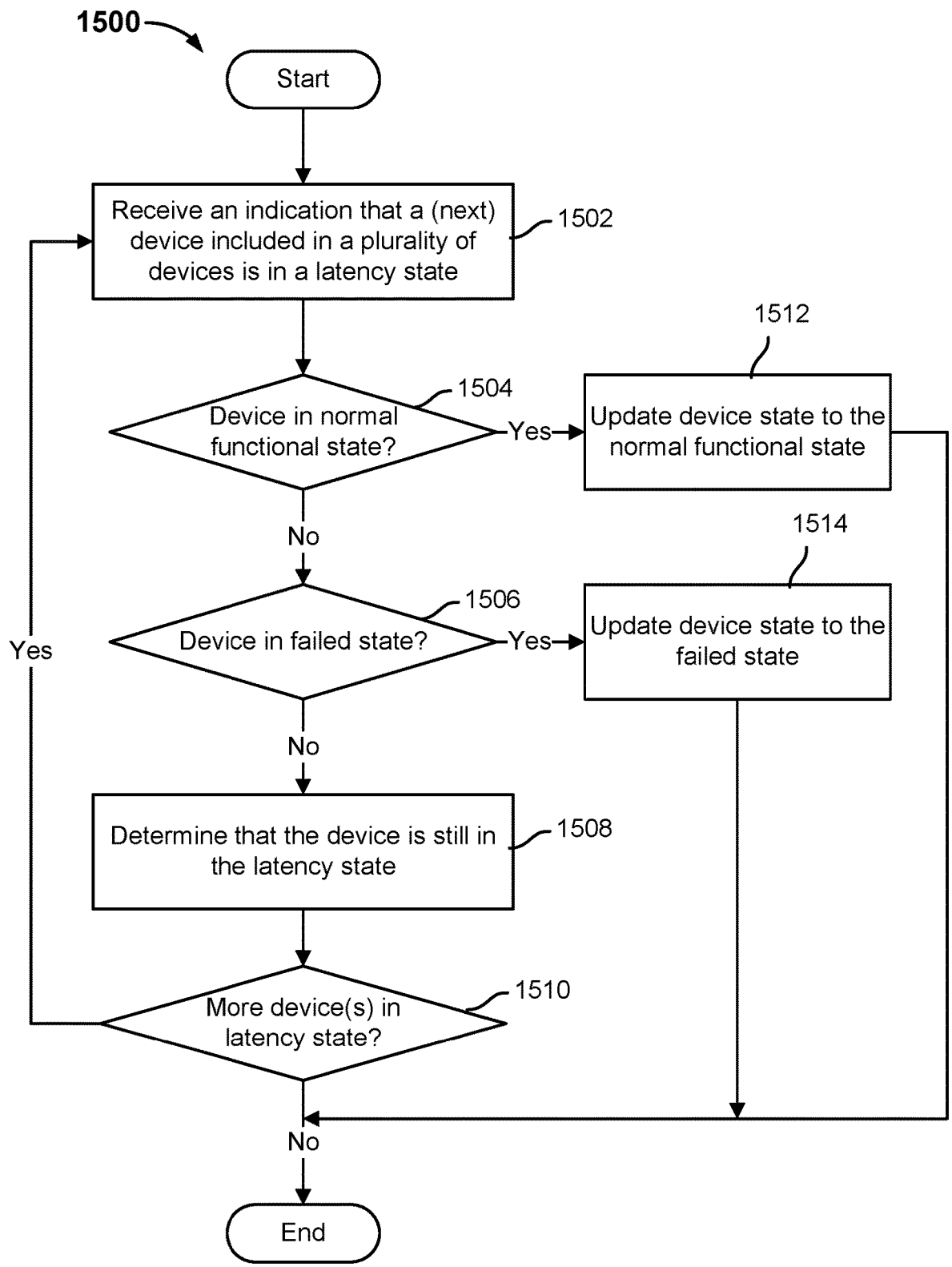
FIG. 15 is a flow diagram showing an example process for determining whether a device in a latency state has entered a different state.

FIG. 15 is a flow diagram showing an example process for determining whether a device in a latency state has entered a different state. In some embodiments, process 1500 is implemented at system 100 of FIG. 1 and/or system 200 of FIG. 2.

Process 1500 describes an example process of determining whether a device in a latency state remains in the latency state or has entered in a failed state or returned to the normal functional state. Process 1500 may be performed continuously to determine whether a device in the latency state has changed states.

At 1502, an indication that a (next) device included in a plurality of devices is in a latency state is received.

At 1504, it is determined whether the device is in a normal functional state. In the event that the device is in a normal functional state, control is transferred to 1512, at which a device state is updated to the normal functional state. Otherwise, in the event that the device is not in a normal functional state, control is transferred to 1506. It is determined whether the device in the latency state meets the one or more criteria associated with returning to a normal functional state. Criteria associated with returning to a normal functional state indicate that the device is starting to exhibit low latency characteristics. For example, a criterion associated with returning to a normal functional state is that the postponed writes queue maintained for the device is empty. In another example, a criterion associated with returning to a normal functional state is that the stripe unit data status data structure maintained for the device indicates that all stripe units of the device store current data.

At 1506, it is determined whether the device is in a failed state. In the event that the device is in a failed state, control is transferred to 1514, at which a device state is updated to the failed state. Otherwise, in the event that the device is not in a failed state, control is transferred to 1508. It is determined whether the device in the latency state meets the one or more criteria associated with entering a failed state.

Criteria associated with entering a failed state indicate that the device is not recovering in a timely manner, which is causing the RAID group to remain in a degraded state indefinitely. For example, a criterion associated with entering a failed state is that the postponed writes queue maintained for the device includes more than a predetermined number of entries, which indicates that it would take an indefinite length of time to completely repair the device. In another example, a criterion associated with entering a failed state is that the device has remained in the latency state for longer than a predetermined length of time.

At 1508, it is determined that the device is still in the latency state. A device in the latency state that has neither returned to the normal functional state nor has entered the failed state is determined to remain in the latency state.

At 1510, it is determined whether there is at least one more device included in the plurality of devices that is in the latency state. In the event that there is at least one more device in the latency state, control is returned to 1502. Otherwise, in the event that there are no more devices in the latency state, process 1500 ends.

In some embodiments, if the RAID group is already in a degraded mode (i.e., if there is a device in a latency state or a device that is currently being rebuilt after having completed failed), it is generally not recommended to designate another device in the RAID group as being in the latency state. For example, if a first device of a RAID group is in the latency state, then a second device of the RAID group is permitted to enter the failed state. In another example, if a first device of a RAID group is already in the failed state, then a second device of the RAID group is not permitted to enter the latency state. In another example, it is also not permitted for one device to be both in the latency state and also the failed state.

Figure 16:
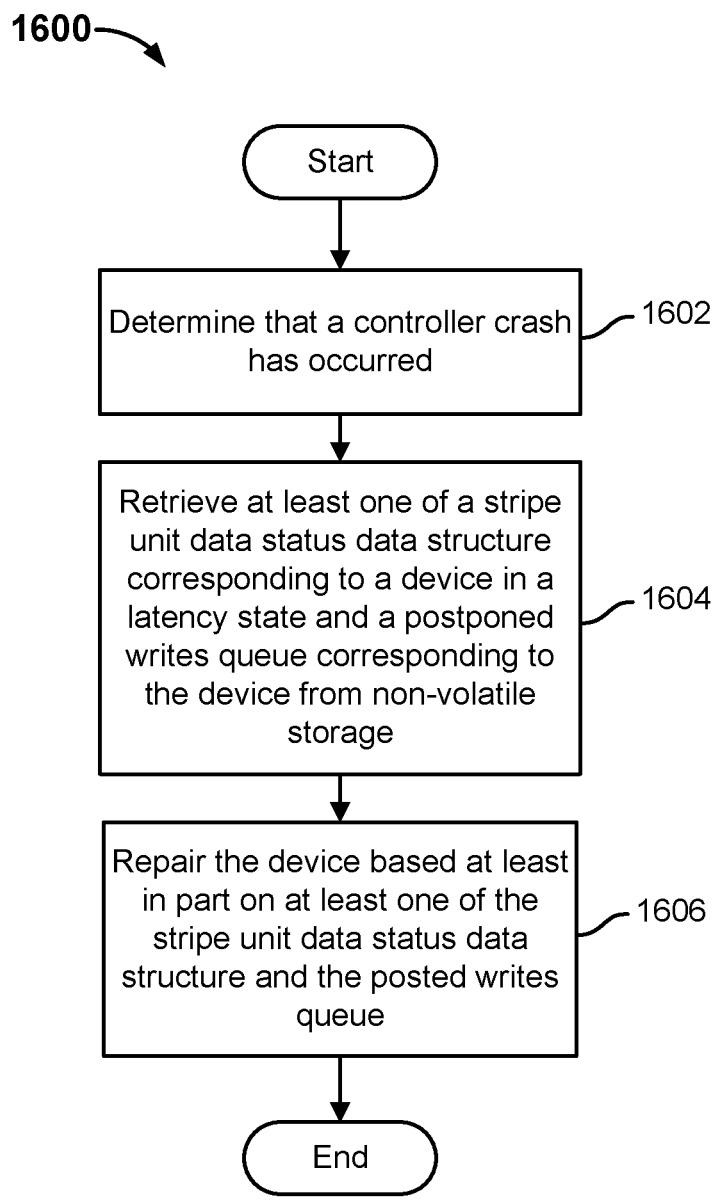
FIG. 16 is a flow diagram showing an example process for resuming a repair process of a device in the latency state after a controller crash.

FIG. 16 is a flow diagram showing an example process for resuming a repair process of a device in the latency state after a controller crash. In some embodiments, process 1600 is implemented at system 100 of FIG. 1 and/or system 200 of FIG. 2.

Process 1600 describes an example process of resuming a repair process of a device in the latency state after a primary RAID controller crashes. For example, process 1600 may be performed by the secondary RAID controller after a failover event. Process 1600 could also be performed for when the system restarts.

At 1602, it is determined that a controller crash has occurred.

At 1604, at least one of a stripe unit data status data structure corresponding to a device in a latency state and a postponed writes queue corresponding to the device is retrieved from a non-volatile storage. At least one of the latency state related data structures for a device that is in a latency state is recovered from a non-volatile storage (as the contents of a volatile storage have been lost due to the crash).

At 1606, the device is repaired based at least in part on the at least one of the stripe unit data status data structure and the postponed writes queue. A repair process that uses either or both of the recovered stripe unit data status data structure and/or the recovered postponed writes queue (e.g., process 1200 of FIG. 12 or process 1300 of FIG. 13) can continue to repair the device even after the crash.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
process a write request to a plurality of devices associated with a redundant storage system, wherein the write request comprises first current data to be written to a plurality of stripe units corresponding to a specified stripe of the plurality of devices;
receive a set of indications of write successes of the first current data with respect to stripe units corresponding to the specified stripe of devices other than a first device from the plurality of devices;
determine that a stripe unit corresponding to the specified stripe of the first device, for which the first current data associated with the write request was not successfully written, stores stale data;
send an indication of a completed write to a requestor associated with the write request based at least in part on a determination that the first device meets a set of one or more criteria associated with a latency state;
in response to the determination that the first device meets the set of one or more criteria associated with the latency state, generate at least one data structure corresponding to the first device to store data indicating that the stripe unit corresponding to the specified stripe of the first device stores the stale data, wherein the at least one data structure is configured to be used to repair the first device including by replacing the stale data stored in the stripe unit corresponding to the specified stripe of the first device with second current data corresponding to the stripe unit corresponding to the specified stripe of the first device;
add a new entry in the at least one data structure comprising a postponed writes queue corresponding to the first device corresponding to the stripe unit corresponding to the specified stripe of the first device; and
associate the new entry in the postponed writes queue to a buffer storing a portion of the first current data corresponding to the stripe unit corresponding to the specified stripe of the first device; and
a memory coupled to the processor and configured to store the write request.

2. The system of claim 1, wherein the redundant storage system comprises a Redundant Array of Inexpensive Drives (RAID) system.

3. The system of claim 1, wherein the processor is further configured to:
determine that the first device meets the set of one or more criteria associated with the latency state based at least in part on a manner in which the first device processes the write request; and
wherein the at least one data structure further comprises a stripe unit data status data structure corresponding to the first device.

4. The system of claim 3, wherein the processor is further configured to, for the write request that is not written to the first device, write the first current data with respect to the stripe unit corresponding to the specified stripe of the first device to a corresponding stripe unit in a spare device.

5. The system of claim 4, wherein the corresponding stripe unit is at a same address in the spare device relative to the stripe unit corresponding to the specified stripe of the first device.

6. The system of claim 4, wherein the corresponding stripe unit is in a mapped offset location on the spare device relative to the stripe unit corresponding to the specified stripe of the first device.

7. The system of claim 1, wherein the set of criteria comprises the first device not having responded to the write request within a predetermined interval of time.

8. The system of claim 1, wherein the processor is further configured to:
- receive a read request to the stripe unit corresponding to the specified stripe of the first device;
- determine whether data associated with the stripe unit corresponding to the specified stripe of the first device is buffered; and
- in response to a first determination that the data associated with the stripe unit corresponding to the specified stripe of the first device is buffered:
  - read buffered data associated with the stripe unit corresponding to the specified stripe of the first device; and
  - determine a response to the read request based at least in part on the read buffered data.

9. The system of claim 1, wherein the processor is further configured to:
- obtain a stripe unit identifier stored in an entry in the at least one data structure comprising the postponed writes queue corresponding to the first device;
- determine whether data associated with the stripe unit identifier is buffered;
- in response to a first determination that the data associated with the stripe unit identifier is buffered:
  - read buffered data associated with the stripe unit identifier;
  - store the read buffered data in the stripe unit corresponding to the specified stripe of the first device associated with the stripe unit identifier; and
  - remove the entry from the postponed writes queue; and
- in response to a second determination that the data associated with the stripe unit identifier is not buffered:
  - reconstruct the data associated with the stripe unit identifier from data stored in devices included in the plurality of devices other than the first device;
  - store the reconstructed data in the stripe unit corresponding to the specified stripe of the first device associated with the stripe unit identifier; and
  - remove the entry from the postponed writes queue.

10. The system of claim 1, wherein the processor is further configured to:
- determine the stripe unit corresponding to the specified stripe of the first device to repair from the at least one data structure comprising a stripe unit data status data structure corresponding to the first device;
- reconstruct data associated with the stripe unit corresponding to the specified stripe of the first device from data stored in the devices other than the first device from the plurality of devices;
- store the reconstructed data in the stripe unit corresponding to the specified stripe of the first device; and
- update the stripe unit data status data structure to indicate that the stripe unit stores current data.

11. The system of claim 1, wherein the processor is further configured to:
- determine corrupt data associated with a corrupted stripe unit in the first device;
- determine that the at least one data structure comprising a stripe unit data status data structure corresponding to the first device indicates that the corrupted stripe unit stores data that is current; and
- update the stripe unit data status data structure corresponding to the first device to indicate that the stripe unit does not store data that is current.

12. The system of claim 1, wherein the processor is further configured to:
- determine whether the first device meets a set of criteria associated with a normal function state; and
- determine whether the first device meets a set of criteria associated with a failed state.

13. The system of claim 1, wherein the processor is further configured to:
- determine whether the first device meets a set of criteria associated with a normal functional state;
- determine whether the first device meets a set of criteria associated with a failed state; and
- in response to a determination that the first device does not meet the set of criteria associated with the normal functional state nor the set of criteria associated with the failed state, determine that the first device remains in the latency state.

14. The system of claim 1, wherein the processor is further configured to repair the first device including to:
- use the at least one data structure corresponding to the first device to determine that the stripe unit corresponding to the specified stripe of the first device stores the stale data;
- obtain the second current data corresponding to the stripe unit corresponding to the specified stripe of the first device by performing reconstruction using data stored in the devices other than the first device from the plurality of devices; and
- replace the stale data stored in the stripe unit corresponding to the specified stripe of the first device with the second current data.

15. The system of claim 1, wherein the processor is further configured to repair the first device including to:
- use the at least one data structure corresponding to the first device to determine that the stripe unit corresponding to the specified stripe of the first device stores the stale data;
- obtain the second current data corresponding to the stripe unit corresponding to the specified stripe of the first device by retrieving the second current data from the buffer; and
- replace the stale data stored in the stripe unit corresponding to the specified stripe of the first device with the second current data.

16. The system of claim 1, wherein the at least one data structure corresponding to the first device comprises the postponed writes queue, the processor is further configured to:
- determine that the postponed writes queue includes at least a predetermined threshold number of entries; and
- in response to the determination that the postponed writes queue includes at least the predetermined threshold number of entries, determine that the first device is in a failed state.

17. A method, comprising:
- processing a write request to a plurality of devices associated with a redundant storage system, wherein the write request comprises first current data to be written to a plurality of stripe units corresponding to a specified stripe of the plurality of devices;

receiving a set of indications of write successes of the first current data with respect to stripe units corresponding to the specified stripe of devices other than a first device from the plurality of devices;

determining that a stripe unit corresponding to the specified stripe of the first device, for which the first current data associated with the write request was not successfully written, stores stale data;

sending an indication of a completed write to a requestor associated with the write request based at least in part on a determination that the first device meets a set of one or more criteria associated with a latency state;

in response to the determination that the first device meets the set of one or more criteria associated with the latency state, generating at least one data structure corresponding to the first device to store data indicating that the stripe unit corresponding to the specified stripe of the first device stores the stale data, wherein the at least one data structure is configured to be used to repair the first device including by replacing the stale data stored in the stripe unit corresponding to the specified stripe of the first device with second current data corresponding to the stripe unit corresponding to the specified stripe of the first device;

adding a new entry in the at least one data structure comprising a postponed writes queue corresponding to the first device corresponding to the stripe unit corresponding to the specified stripe of the first device; and associating the new entry in the postponed writes queue to a buffer storing a portion of the first current data corresponding to the stripe unit corresponding to the specified stripe of the first device.

18. The method of claim 17, wherein the set of criteria comprises the first device not having responded to the write request within a predetermined interval of time.

19. The method of claim 17, further comprising:
determining whether the first device meets a set of criteria associated with a normal function state; and
determining whether the first device meets a set of criteria associated with a failed state.

20. A computer program product embodied in a non-transitory computer readable storage medium and comprising computer instructions for:
processing a write request to a plurality of devices associated with a redundant storage system, wherein the write request comprises first current data to be written to a plurality of stripe units corresponding to a specified stripe of the plurality of devices;

receiving a set of indications of write successes of the first current data with respect to stripe units corresponding to the specified stripe of devices other than a first device from the plurality of devices;

determining that a stripe unit corresponding to the specified stripe of the first device, for which the first current data associated with the write request was not successfully written, stores stale data;

sending an indication of a completed write to a requestor associated with the write request based at least in part on a determination that the first device meets a set of one or more criteria associated with a latency state;

in response to the determination that the first device meets the set of one or more criteria associated with the latency state, generating at least one data structure corresponding to the first device to store data indicating that the stripe unit corresponding to the specified stripe of the first device stores the stale data, wherein the at least one data structure is configured to be used to repair the first device including by replacing the stale data stored in the stripe unit corresponding to the specified stripe of the first device with second current data corresponding to the stripe unit corresponding to the specified stripe of the first device;

adding a new entry in the at least one data structure comprising a postponed writes queue corresponding to the first device corresponding to the stripe unit corresponding to the specified stripe of the first device; and associating the new entry in the postponed writes queue to a buffer storing a portion of the first current data corresponding to the stripe unit corresponding to the specified stripe of the first device.

21. A system, comprising:
a processor configured to:
process a write request to a plurality of devices associated with a redundant storage system;
receive a set of indications of write successes from a set of devices included in the plurality of devices other than a first device;
send an indication of a completed write to a requestor associated with the write request based at least in part on a determination that the first device meets a set of one or more criteria associated with a latency state;
obtain a stripe unit identifier stored in an entry in a postponed writes queue corresponding to the first device;
determine whether data associated with the stripe unit identifier is buffered;
in response to a first determination that the data associated with the stripe unit identifier is buffered:
read buffered data associated with the stripe unit identifier;
store the read buffered data in a stripe unit of the first device associated with the stripe unit identifier; and
remove the entry from the postponed writes queue; and
in response to a second determination that the data associated with the stripe unit identifier is not buffered:
reconstruct the data associated with the stripe unit identifier from data stored in devices included in the plurality of devices other than the first device;
store the reconstructed data in the stripe unit of the first device associated with the stripe unit identifier; and
remove the entry from the postponed writes queue; and
a memory coupled to the processor and configured to store the write request.

* * * * *

UNITED STATES PATENT AND TRADEMARK OFFICE
CERTIFICATE OF CORRECTION

PATENT NO. : 10,936,206 B1  
APPLICATION NO. : 15/886156  
DATED : March 2, 2021  
INVENTOR(S) : Zubin D. Dittia Page 1 of 1

It is certified that error appears in the above-identified patent and that said Letters Patent is hereby corrected as shown below:

In the Drawings

In sheet(s) 2 of 16, figure 2, delete "Device e" and insert --Device E--, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*